(12) United States Patent
Kouno et al.

(10) Patent No.: US 11,073,178 B2
(45) Date of Patent: Jul. 27, 2021

(54) OIL-IMPREGNATED SINTERED BEARING AND METHOD FOR MANUFACTURING THE SAME

(71) Applicants: MITSUBISHI MATERIALS CORPORATION, Tokyo (JP); DIAMET CORPORATION, Niigata (JP)

(72) Inventors: Hajime Kouno, Kitamoto (JP); Yoshinari Ishii, Niigata (JP); Tsuneo Maruyama, Niigata (JP); Jyun Katou, Kitamoto (JP); Kenji Orito, Kitamoto (JP)

(73) Assignee: DIAMET CORPORATION, Niigata (JP)

( * ) Notice: Subject to any disclaimer, the term of this patent is extended or adjusted under 35 U.S.C. 154(b) by 0 days.

(21) Appl. No.: 16/472,660

(22) PCT Filed: Dec. 20, 2017

(86) PCT No.: PCT/JP2017/045796
§ 371 (c)(1),
(2) Date: Jun. 21, 2019

(87) PCT Pub. No.: WO2018/117183
PCT Pub. Date: Jun. 28, 2018

(65) Prior Publication Data
US 2019/0360528 A1 Nov. 28, 2019

(30) Foreign Application Priority Data

Dec. 22, 2016 (JP) .............................. JP2016-249741
Dec. 22, 2016 (JP) .............................. JP2016-249742

(51) Int. Cl.
*F16C 33/10* (2006.01)
*F16C 17/02* (2006.01)
(Continued)

(52) U.S. Cl.
CPC .............. *F16C 33/104* (2013.01); *B22F 3/16* (2013.01); *B22F 3/26* (2013.01); *B22F 5/10* (2013.01);
(Continued)

(58) Field of Classification Search
CPC ...... F16C 17/02; F16C 33/104; F16C 33/128; F16C 33/145; F16C 2202/10;
(Continued)

(56) References Cited

U.S. PATENT DOCUMENTS 5,282,688 A    2/1994   Kanezaki et al.
6,049,983 A *  4/2000   Miyasaka ............... F16C 33/12
                                               29/898.057
(Continued)

FOREIGN PATENT DOCUMENTS

CH          441880 A       8/1967
JP          H04-307111 A  10/1992
(Continued)

OTHER PUBLICATIONS

International Search Report dated Mar. 6, 2018 for the corresponding PCT Patent Application No. PCT/JP2017/045796.
(Continued)

*Primary Examiner* — Alan B Waits
(74) *Attorney, Agent, or Firm* — Leason Ellis LLP

(57) ABSTRACT

An oil-impregnated sintered bearing comprises a bearing hole. In the bearing, sliding surfaces supporting an outer circumferential surface of a shaft and an oil supply surface whose diameter is larger than that of the sliding surfaces are formed on an inner circumferential surface of the bearing hole into which the shaft is inserted. The sliding surfaces and the oil supply surfaces are adjacent to each other in the axial direction of the bearing hole. A height gap "d1" between the sliding surfaces and the oil supply surface is not less than (Continued)

0.01% and not more than 15% of an inner diameter of the sliding surfaces. A surface opening percentage of the sliding surfaces is not higher than 10%. A surface opening percentage of the oil supply surface is higher than 10%. An average circle-equivalent diameter of opening parts of pores on the sliding surfaces is not larger than 20 μm.

13 Claims, 21 Drawing Sheets

(51) Int. Cl.
    *F16C 33/12*     (2006.01)
    *F16C 33/14*     (2006.01)
    *B22F 3/16*     (2006.01)
    *B22F 5/10*     (2006.01)
    *B22F 3/26*     (2006.01)
    *B22F 7/00*     (2006.01)

(52) U.S. Cl.
    CPC .............. *B22F 7/002* (2013.01); *F16C 17/02* (2013.01); *F16C 33/128* (2013.01); *F16C 33/145* (2013.01); *B22F 2301/10* (2013.01); *B22F 2301/35* (2013.01); *F16C 2202/10* (2013.01); *F16C 2204/10* (2013.01); *F16C 2220/20* (2013.01)

(58) Field of Classification Search
CPC .... F16C 2204/10; F16C 2220/20; B22F 3/16; B22F 3/26; B22F 5/10; B22F 7/002; B22F 2301/10; B22F 2301/35; B22F 2005/103
See application file for complete search history.

(56) References Cited

U.S. PATENT DOCUMENTS

| | | | |
|---|---|---|---|
| 2002/0051590 A1 | 5/2002 | Sugimoto et al. | |
| 2011/0025151 A1 | 2/2011 | Lim et al. | |
| 2017/0254357 A1 | 9/2017 | Komatsubara et al. | |
| 2018/0223902 A1* | 8/2018 | Izawa | C23C 28/027 |
| 2019/0055984 A1* | 2/2019 | Ishii | C22C 1/05 |
| 2019/0078617 A1* | 3/2019 | Harada | F16C 33/12 |
| 2020/0095662 A1* | 3/2020 | Fukuda | C22C 38/002 |

FOREIGN PATENT DOCUMENTS

| | | | | |
|---|---|---|---|---|
| JP | H05-115146 A | | 5/1993 | |
| JP | 09-316210 A | | 12/1997 | |
| JP | H11-236604 A | | 8/1999 | |
| JP | 2002106568 A | * | 4/2002 | ............ F16C 23/041 |
| JP | 2005-009575 A | | 1/2005 | |
| JP | 2005-233428 A | | 9/2005 | |
| JP | 2009-30780 A | | 2/2009 | |
| JP | 2010-31909 A | | 2/2010 | |
| JP | 2014-30344 A | | 2/2014 | |
| JP | 2015-055312 A | | 3/2015 | |
| JP | 2016-50648 A | | 4/2016 | |

OTHER PUBLICATIONS

Extended European Search Report dated Aug. 12, 2020 for the corresponding European Patent Application No. 17883440.4.

\* cited by examiner (a)

(b)

(a)

(b)

(a)

(b)

(a)

(b)

(a)

(b)

(a)

(b)

(a)

(b)

OIL-IMPREGNATED SINTERED BEARING AND METHOD FOR MANUFACTURING THE SAME

CROSS-REFERENCE TO RELATED PATENT APPLICATIONS

This application is a U.S. National Phase Application under 35 U.S.C. § 371 of International Patent Application No. PCT/JP2017/045796, filed Dec. 20, 2017, and claims the benefit of Japanese Patent Application No. 2016-249741, filed Dec. 22, 2016, and Japanese Patent Application No. 2016-249742, filed Dec. 22, 2016, all of which are incorporated herein by reference in their entirety. The International Application was published in Japanese on Jun. 28, 2018 as International Publication No. WO/2018/117183 under PCT Article 21(2).

FIELD OF THE INVENTION

The present invention relates to an oil-impregnated sintered bearing and a method for manufacturing thereof in which impregnation of lubricant oil into an inside thereof and lubrication can be smoothly enabled.

BACKGROUND ART OF THE INVENTION

An oil-impregnated sintered bearing is used in a state in which lubricant oil is impregnated in pores: when the shaft is driven, the lubricant oil exudes from inside to a gap between the shaft and the bearing, the lubricant oil is pressurized by rotation of the shaft, so that the shaft is supported. Owing to such a lubrication property, it is broadly used as a bearing such as a bearing in a motor in a vehicle and the like since it can be used for a long time without oiling.

In such an oil-impregnated sintered bearing, in order to add adequate pressure on the lubricant oil on a sliding surface appropriately, employed are means for reducing leaks of the lubricant oil from the sliding surface, e.g., increasing flow resistance of the lubricant oil by sealing a part of the pores or reducing a size of the pores inside the bearing.

For example, in Japanese Unexamined Patent Application, First Publication No. H04-307111, disclosed is a method for manufacturing an oil-impregnated sintered bearing: forming a green compact before sintering by forming a through hole to be a bearing hole with using a rod having a rough part along an axial direction in which a roughness thereof is larger than that of the other part which is formed on a part of an outer circumference surface, and then sintering the green compact. In this oil-impregnated sintered bearing, the shaft is supported on the bearing hole at an inner circumferential surface of a part in which the pores are sealed, and the oil is exuded from the other part of the inner circumferential surface than the part in which the pores are sealed and supplied to the part in which the pores are sealed.

In this case, the rough part is formed in a belt shape along the axial direction of the rod, a circumferential part around the pores are pressed by the rough part of the rod and plastically flown into the pores so as to seal them when powder is pressed and formed. It is described that the part with which the rough part is in contact is formed to be slightly projected, but pressed in a following sizing process so as to be flatten with the inner circumferential surface of the bearing hole.

Japanese Unexamined Patent Application, First Publication No. H05-115146 discloses an oil-impregnated sintered bearing in which on an inner circumferential surface of a bearing hole, step parts to be sliding surfaces are formed along a circumferential direction so that gaps are formed between a shaft and a bottom surface of a groove part that is formed between the step parts adjacent to each other, and an air permeability at the sliding surfaces of the step parts are made smaller than an air permeability at the inner circumferential surface of the bearing hole. In this case, the air permeability at the sliding surfaces of the step parts is set at $3\times10^{-10}$ $cm^2$, the air permeability at the bottom surface of the groove part is set at $30\times10^{-10}$ $cm^2$, and a height of the step parts is set at 0.02 mm: sealing methods by filling-up, plating, or coating are described as means for reducing the air permeability at the sliding surfaces of the step parts. It is described that in this oil-impregnated sintered bearing, since the shaft is in contact with the sliding surfaces of the step parts but the shaft is not contact with the bottom surface of the groove part having the larger air permeability; so that a certain amount of oil can be securely sucked from and dispensed to the groove part, and dynamic pressure can be generated in the gap surrounded by the groove part and the shaft.

Technical Problem

Japanese Unexamined Patent Application, First Publication No. H04-307111 does not describe a specific air permeability at a surface formed by a roughened part and the other surfaces. In a degree of the air permeability described in Japanese Unexamined Patent Application, First Publication No. H05-115146, it is difficult during high rotation and the like to supply an adequate amount of oil with driving the bearing and to reduce the oil leakage from the sliding surface, so that a bearing seizure may be occurred.

The present invention is achieved in consideration of the above circumstances, and has an object to reduce a friction at the sliding surface and improve a sliding property of a bearing, by supplying an adequate amount of oil to the sliding surface and preventing the supplied oil from moving inside from the sliding surface.

SUMMARY OF THE INVENTION

Solution to Problem

In an oil-impregnated sintered bearing according to the present invention, on an inner circumferential surface of a bearing hole into which a shaft can be inserted, one or more sliding surfaces supporting an outer circumferential surface of the shaft and one or more oil supply surfaces having a larger radius of curvature than that of the sliding surface(s) are formed adjacent to each other along an axial direction of the bearing hole; a height gap between the sliding surface(s) and the oil supply surface(s) is not less than 0.01% and not more than 15% of an inner diameter of the sliding surface(s); a surface opening percentage of the sliding surface(s) is not more than 10%; a surface opening percentage of the oil supply surface(s) is more than 10%; and an average circle-equivalent diameter of opening parts of pores at the sliding surface(s) is not larger than 20 µm.

In this oil-impregnated sintered bearing, a space part having a size of at least not smaller than 0.01% and not larger than 15% of the inner diameter of the sliding surface(s) is formed between the shaft and the oil supply surface(s) when the shaft is inserted in the bearing hole and the shaft is in contact with the sliding surface(s) because the height gap is formed with not less than 0.01% and not more than 15% of the inner diameter of the sliding surface(s) between the sliding surface(s) and the oil supply surface(s). Accordingly, it is possible to reliably support the shaft by the sliding surface(s) and maintain a non-contact state between the shaft and the oil supply surface(s). Moreover, the space part can work as an oil pool, so that when the oil introduced between the shaft and the sliding surface(s) is discharged from between the shaft and the sliding surface(s), the oil can be recovered at the space part. Furthermore, the oil can be left in the space part, it is possible to prevent the oil from flowing outside. Moreover, it is possible to supply the oil immediately from the space part to the sliding surface(s). Accordingly, even when it is used for a long time, the oil can be adequately maintained between the shaft and the sliding surface(s), so that a lubrication property (a bearing property) at the sliding surface(s) can be maintained.

In this case, if the height gap between the sliding surface(s) and the oil supply surface(s) is less than 0.01% of the inner diameter of the sliding surface(s), the size of the space part for recovering the oil is not enough; and it is difficult for the space part to have an adequate function as the oil pool. Therefore, in a long-time usage of the bearing, it is not possible to maintain the bearing property at a high load. If the height gap between the sliding surface(s) and the oil supply surface(s) exceeds 15% of the inner diameter of the sliding surface(s), a step gap between the sliding surface(s) and the oil supply surface(s) is large, so that it takes a long time to sufficiently supplying the oil to the sliding surface(s) especially when starting: as a result, a friction coefficient may be increased and the sliding property of the bearing may be deteriorated. Moreover, since the oil cannot be smoothly supplied from the oil supply surface(s) to the sliding surface(s), it is difficult to supply the sufficient oil for maintaining the bearing property under the high load.

In this oil-impregnated sintered bearing, the oil is exuded from the oil supply surface(s) having the surface opening percentage higher than 10% and introduced between the shaft and the sliding surface(s); and the surface opening percentage is 10% or lower and the average circle-equivalent diameter is 20 μm or smaller at the opening parts of the pores at the sliding surface(s), so that an oil film is formed between the shaft and the oil-impregnated sintered bearing, and it is possible to reduce the friction resistance.

In this case, if the surface opening percentage at the sliding surface(s) supporting the shaft is more than 10%, the oil cannot be held and flow into the bearing: the oil film between the shaft and the sliding surface(s) is reduced, and the bearing seizure may be occurred. If the surface opening percentage of the oil supply surface(s) is not more than 10%, it is difficult to sufficiently supply the oil from the inside. Note that the surface opening percentage is an area rate of opening parts in an unit area at the sliding surface(s) or the oil supply surface(s). A value thereof is an average value in random views (for example, 1 mm×0.8 mm); it is desirable not to exceed at most 30% at the oil supply surface(s).

The average diameter of the pores opening at the sliding surface(s) is 20 μm or smaller: because the oil can easily go through the pores by the high load if the average diameter exceeds 20 μm, and the oil film cannot be maintained, so that surface-pressure resistance is deteriorated.

As a preferable embodiment of the oil-impregnated sintered bearing according to the present invention, it is preferable that when an area rate of the sliding surface(s) is "a" in regard to a whole area of the bearing hole as 1, the rate "a" be not less than 0.4 and not more than 0.98.

Since the sliding surface(s) and the oil supply surface(s) on the inner circumferential surface of the bearing hole are formed adjacent to each other in the axial direction, the shaft is in contact with the sliding surface(s) in a range of ("a"×100) % of a length of the bearing hole even though the shaft is in contact with any position of the inner circumferential surface of the bearing hole, so that the shaft can be stably supported. Note that the area rate of the sliding surface(s) is a rate of the area of the sliding surface(s) when the area of the whole inner circumferential surface of the bearing hole is 1.

If the rate "a" of the area of the sliding surface(s) is less than 0.4, surface pressure on the sliding surface(s) is high in a practical size, so that the sliding surface(s) is worn off, and the bearing seizure may be easily occurred. If the rate "a" of the area of the sliding surface(s) is reduced to be less than 0.4 in order to improve a durability of the bearing, it is necessary to increase a size of the bearing: it is not practical. In a case in which the rate "a" of the area of the sliding surface(s) exceeds 0.98, it is not possible to sufficiently supply the lubricant oil, so that the sliding surface(s) is worn off and the bearing seizure can be easily occurred.

As a preferred embodiment of the oil-impregnated sintered bearing according to the present invention, the oil supply surface(s) be provided at a part except for both end parts of the bearing hole; and the height gap between the sliding surface(s) and the oil supply surface(s) be not less than 0.01% and not more than 0.5% of the inner diameter of the sliding surface(s). In this case, both the ends of the bearing hole are the sliding surfaces, and the shaft can be supported at both the ends of the bearing hole.

As a preferred embodiment of the oil-impregnated bearing according to the present invention, the oil supply surface(s) be formed between the sliding surfaces.

Since the oil supply surface(s) is formed between the sliding surfaces; in other words, since the sliding surfaces are formed both sides of the oil supply surface(s), it is possible to supply the oil efficiently from the oil supply surface(s) to the sliding surfaces, and reduce to flow out to end surfaces.

As a preferred embodiment of the oil-impregnated sintered bearing according to the present invention, the oil supply surface(s) be provided opening at least one of end parts of the bearing hole, and the height gap between the sliding surface(s) and the oil supply surface(s) be 0.5% to 15% (inclusive) of the inner diameter of the sliding surface(s). In this case, the height gap between the oil supply surface(s) and the sliding surface(s) can be set large. Moreover, the oil supply surface(s) may be formed at both end parts of the inner circumferential surface of the bearing hole.

A method for manufacturing an oil-impregnated sintered bearing of the present invention includes: a green-compact forming process forming a tubular green compact by filling and compressing material powder in a forming tubular space between a forming die plate having a forming through hole and a forming inner die arranged in a center of the forming through hole; a sintering process forming a sintered body by sintering the green compact; and a sizing process sizing a dimension of the sintered body and forming a bearing hole in the sintered body into which a shaft can be inserted, by pushing and compressing the sintered body in a sizing tubular space between a sizing die plate and a sizing core rod of a sizing die. In the method, in the green-compact forming process, one or more large-diameter surfaces formed to be outwardly protruded in a radial direction than the other part on at least a part of an outer circumferential surface of the forming inner die for forming an inner circumferential surface of the green compact form one or more depressed surfaces having a larger radius of curvature on at least a part of the inner circumferential surface of the green compact than the other part, so that the depressed surface(s) and one or more protruded surfaces adjacent to the depressed surface(s) are formed on the inner circumferential surface of the green compact, and a height gap between the depressed surface(s) and the protruded surface(s) is formed to be not smaller than 0.1% and not larger than 15.5% of an inner diameter of the protruded surface(s); in the sintering process, the green compact is sintered, so that the sintered body in which a surface opening percentage is higher than 10% at an inner circumferential surface, and the depressed surface(s) is (are) formed as one or more oil supply surfaces; and in the sizing process, an outer circumferential surface of the sizing core rod that is formed to have an outer diameter larger than the protruded surface(s) of the sintered body and smaller than the depressed surface(s), forms one or more sliding surfaces in which a surface opening percentage is not higher than 10% and an average circle-equivalent diameter of opening parts of pores is not larger than 20 μm, by compressing outwardly the protruded surface(s) that is formed on the inner circumferential surface of the sintered body in a radial direction by the outer circumferential surface of the sizing core rod, so that a height gap between the oil supply surface(s) and the sliding surface(s) is not less than 0.01% and not more than 15% of an inner diameter of the sliding surface(s), and the oil supply surface(s) and the sliding surface(s) are provided at an inner circumferential surface of the bearing hole.

Forming the depressed surface(s) and the protruded surface(s) on the inner circumferential surface of the green compact of the material powder, the sintered body is formed to have the depressed surface(s) and the protruded surface(s): the sliding surface(s) is (are) formed in the sizing process by compressing and plastically flowing the protruded surface(s) of the inner circumferential surface of the sintered body using the sizing core rod. At this time, the pores on the protruded surface are filled by compressing and plastically flowing, so that a dense layer is formed on a surface of the sliding surface(s), and the surface opening percentage of the sliding surface(s) can be reduced. On the other hand, in the sizing process, the height gap between the sliding surface(s) and the oil supply surface(s) are set to be not less than 0.01% of the inner diameter of the sliding surface(s), and the oil supply surface(s) formed as the depressed surface(s) is not compressed, so that it is possible to maintain a state in which the pores on the oil supply surface(s) are exposed; i.e., a state in which the surface opening percentage is higher than 10%.

If the height gap between the depressed surface(s) and the protruded surface(s) of the green compact is smaller than 0.1% of the inner diameter of the protruded surface(s), the oil supply surface(s) may also be sealed when the protruded surface(s) to be the sliding surface(s) is (are) reformed, and the oil may be insufficiently supplied. If the height gap between the depressed surface(s) and the protruded surface(s) is higher than 15.5%, it is difficult to set the height gap between the sliding surfaces(s) and the oil supply surface(s) to not more than 15% of the inner diameter of the sliding surface(s).

In the method for manufacturing an oil-impregnated sintered bearing of the present invention, a small spring back is occurred on the green compact when releasing the restriction by the forming die plate after forming the green compact between the forming die plate and the forming core rod in the forming die. Accordingly, the green compact can be easily drawn out (released) from the forming core rod since a gap is generated between the forming core rod and the green compact. Therefore, sintering the green compact in which the depressed surface(s) and the protruded surface(s) are formed, and sealing the pores on the protruded surface(s) by compressing the protruded surface(s) on the inner circumferential surface of the sintered body in the sizing process, the sliding surface(s) can be formed to have the low surface opening percentage, and it is possible to maintain the oil supply surface(s) with the high surface opening percentage on the depressed surface(s) that is not compressed.

As described above, in the method for manufacturing an oil-impregnated sintered bearing of the present invention, by the green-compact forming process, the sintering process, and the sizing process which are conventionally performed, with no additional process, it is possible to manufacture the oil-impregnated sintered bearing provided with the sliding surface(s) in which the surface opening percentage is not less than 10% and the average circle-equivalent diameter of the opening parts of the pores is not larger than 20 μm and the oil supply surface(s) in which the surface opening percentage is higher than 10% on the inner circumferential surface of the bearing hole.

As a preferred embodiment of the manufacturing method of the present invention, the forming inner die may be a forming core rod that is inserted into the forming through hole; the height gap between the depressed surface(s) and the protruded surface(s) be formed to be not less than 0.1% and not more than 1.0% of the inner diameter of the protruded surface(s); and the height gap between the oil supply surface(s) and the sliding surface(s) be formed to be not less than 0.01% and not more than 0.5% of the inner diameter of the sliding surface(s). In this case, the height gap between the depressed surface(s) and the protruded surface(s) of the green compact is small, so that it is easy to release the green compact from the forming core rod even though the depressed surface(s) is formed at a middle of a length of the green compact.

As a preferred embodiment of the manufacturing method of the present invention, it is preferable that the forming inner die be formed by a forming core rod inserted into a center of the forming through hoe and either one of an upper end part of a forming lower punch or a lower end part of a forming upper punch that is inserted into the forming tubular space; the one of the punches has a reduced-diameter surface formed on an outer circumferential surface of the end part in which an outer diameter is smaller than the other part of the one of the punches; in the green-compact forming process, forming a depressed surface in which a radius of curvature is larger than the other part, by the reduced-diameter surface, at an end part in an axial direction on the inner circumferential surface of the green compact, so that the depressed surface that opens at the end part in the axial direction and a protruded surface that is adjacent to the depressed surface be formed on the inner circumferential surface of the green compact; and a height gap between the depressed surface and the protruded surface be formed not to be less than 1.0% and not to be more than 15.5% of an inner diameter of the protruded surface; and in the sizing process, the height gap between the oil supply surface(s) and the sliding surface(s) be set to be not less than 0.5% and not more than 15% of the inner diameter of the sliding surface(s). In this case, the height gap between the depressed surface(s) and the protruded surface(s) of the green compact is large though, it is easy to release the green compact from the forming die by providing the depressed surface(s) at the end part(s).

Advantageous Effects of Invention

According to the present invention, the oil is exuded from the oil supply surface(s) having the surface opening percentage higher than 10% and introduced between the shaft and the sliding surface having the surface opening percentage not higher than 10% and the average circle-equivalent diameter (an average opening diameter) of the pores not larger than 20 µm, so that the oil film can be formed between the shaft and the bearing: it is possible to supply the sufficient amount of oil on the sliding surface(s), to suppress the supplied oil from moving from the sliding surface(s) to the interior, to achieve lower friction, and to improve the bearing sliding characteristic as a bearing.

DETAILED DESCRIPTION OF THE INVENTION

Below, embodiments of an oil-impregnated sintered bearing and a manufacturing method thereof according to the present invention will be explained.

First Embodiment

Figure 1:
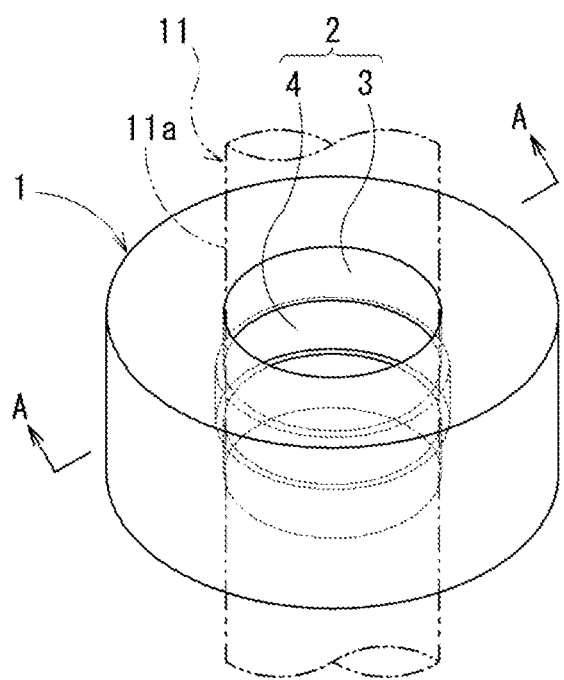
FIG. 1 is a schematic view of an oil-impregnated sintered bearing of a first embodiment of the present invention: the part (a) is a perspective view, the part (b) is a sectional view of an inner circumferential surface of a bearing hole viewed along the line A-A in the part (a).
Figure 1:
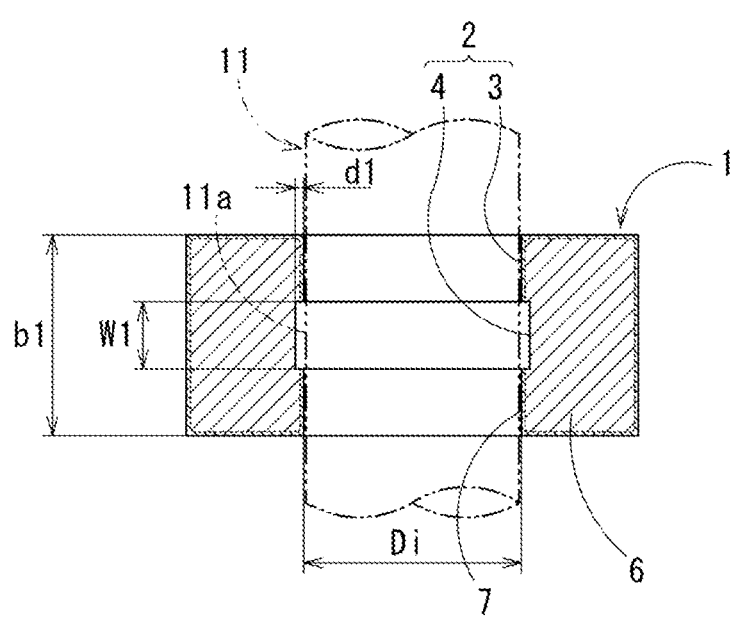
Figure 2:
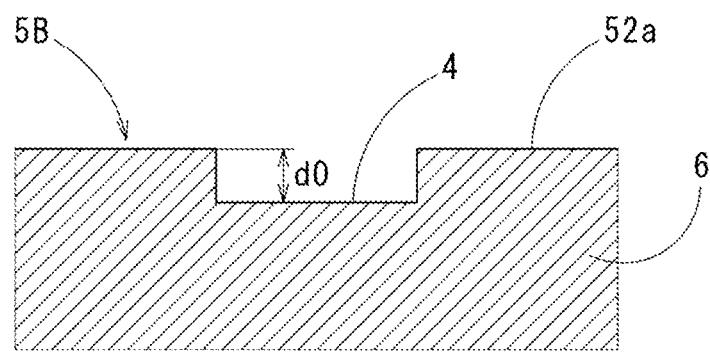
FIG. 2 is a sectional schematic view in a vicinity of the inner circumferential surface of the bearing hole in the oil-impregnated sintered bearing in the first embodiment of the present invention: the part (a) shows a state before a sizing process after a sintering process; and the part (b) shows a state after the sizing process.
Figure 2:
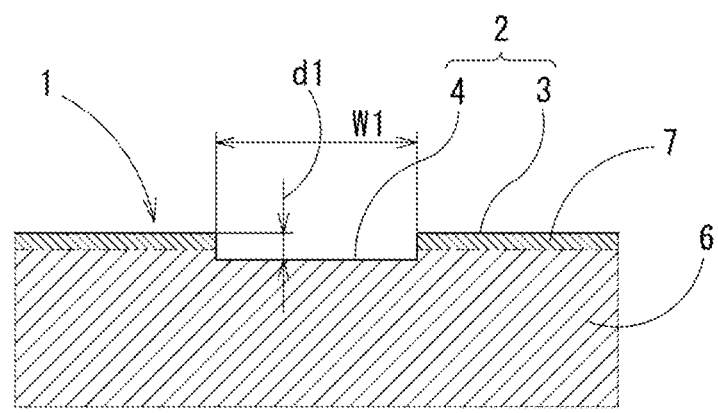

An oil-impregnated sintered bearing 1 is a cylindrical bearing formed from a sintered body of metal powder, in which sliding surfaces 3 supporting an outer circumferential surface 11a of a shaft 11 and an oil supply surface 4 are formed on an inner circumferential surface of a bearing hole 2: the oil supply surface 4 has a larger diameter than that of the sliding surfaces 3 and forms a gap between the outer circumferential surface 11a of the shaft 11: the sliding surfaces 3 and the oil supply surface 4 are adjacent to each other along an axial direction of the bearing hole 2, as shown in FIG. 1 and FIG. 2.

The bearing hole 2 rotatably supports the shaft 11 inserted therein; the sliding surfaces 3 are formed to have slightly a larger inner diameter than an outer diameter of the shaft 11. The inner diameter D1 of the sliding surfaces 3 is not smaller than 1 mm and not larger than 30 mm: a gap is formed between the sliding surfaces 3 and the shaft 11 at not smaller than 0.05% and not larger than 0.6% of the inner diameter D1 of the sliding surfaces 3, for example. On at least a part of the inner circumferential surface of the bearing hole 2, the oil supply surface 4 is formed by a depressed surface having a larger radius of curvature than that of the sliding surfaces 3. In the example shown in FIG. 1 and FIG. 2, the oil supply surface 4 is formed at a middle of the oil-impregnated sintered bearing 1 in a direction of a length b1 (the axial direction), that is, a middle part of the inner circumferential surface of the bearing hole 2: the sliding surfaces 3 are formed adjacent to both ends of the oil supply surface 4, that is, formed on both end parts of the bearing hole 2. The oil supply surface 4 is formed to have a constant width W1 between the sliding surfaces 3. A height gap "d1" between the sliding surfaces 3 and the oil supply surface 4 is formed at not smaller than 0.01% and not larger than 0.5% of the inner diameter D1 of the sliding surfaces 3.

The oil-impregnated sintered bearing 1 is formed from the sintered body of the metal powder, so that it is formed from a porous layer 6 in which pores are formed inside; the pores open at a bottom surface of the oil supply surface 4 on the inner circumferential surface of the bearing hole 2: a surface opening percentage of the pores exceeds 10% at the bottom surface of the oil supply surface 4. The sliding surfaces 3 are formed from dense layers 7 in which the pores are sealed: a surface opening percentage of the sliding surfaces 3 is not more than 10% at surfaces of the sliding surface 3, preferably not more than 5%, more preferably not more than 3%. These surface opening percentages of the pores are area rates of opening parts of the pores in an unit area at the inner circumferential surface of the bearing hole 2.

An average circle-equivalent diameter of the opening parts of the pores opening at the sliding surfaces 3 is not larger than 20 μm and preferably not smaller than 5 μm. At the oil supply surface 4, it is desirable that an average circle-equivalent diameter of the opening parts of the pores be not smaller than 5 μm and not larger than 30 μm.

When an area rate of the sliding surfaces 3 is "a" in regard to a whole area of the inner circumferential surface of the bearing hole 2 as 1, the area rate "a" is not less than 0.4 and not more than 0.98. In this case, when the length of the bearing hole 2 is "b1", (in the present embodiment, it is the same as the length "b1" of the oil-impregnated sintered bearing 1) the shaft 11 is in contact with the sliding surfaces 3 in a range of (a×100) % of the length "b1" of the bearing hole 2 by being inserted into the bearing hole 2 to be in contact with the inner circumferential surface.

Next, a method of manufacturing the oil-impregnated sintered bearing 1 will be explained.

Figure 3:
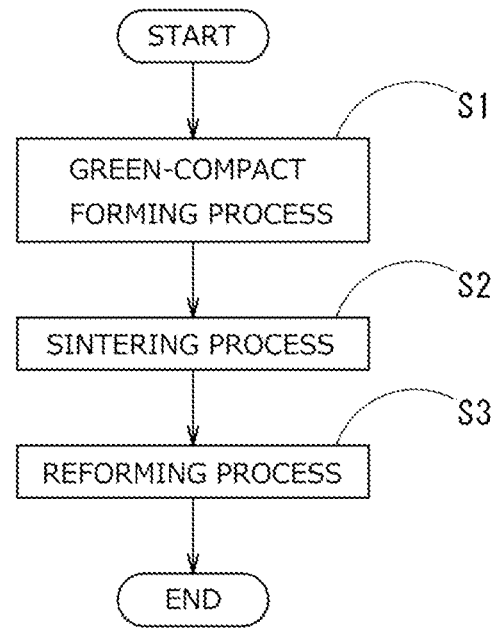
FIG. 3 is a flow process chart showing a method of manufacturing the oil-impregnated sintered bearing of the first embodiment of the present invention.

As shown in a flow process chart of FIG. 3, the method of manufacturing the oil-impregnated sintered bearing 1 includes: a green-compact forming process (S1) forming a cylindrical green compact by filling material powder in a forming die and compressing it, a sintering process (S2) forming a sintered body by sintering the green compact, and a sizing process (S3) forming a bearing hole by resizing the sintered body by compressing after the sintering process (S2).

Metal for material of the oil-impregnated sintered bearing 1 is not particularly limited though, copper based powder or iron-copper based powder is appropriate for the material powder.

The copper based powder is copper powder in which a main ingredient is copper or copper alloy such as copper-tin, copper-phosphorus, or copper-zinc, and includes low melting-point metal powder (e.g., tin powder) having a melting point lower than a sintering temperature at 0.1 to 5 mass % or a solid lubricant such as graphite at 0.5 to 5 mass %.

The iron-copper based powder includes the copper powder at 15 to 80 mass % and iron powder as a residual part; and includes the low melting-point metal at 0.1 to 5 mass % and the solid lubricant at 0.5 to 5 mass %.

Flat particles and granular particles are preferably used for the copper powder in the material powder. For the granular particles, used are substantially spherical electrolytic copper powder, atomized powder and the like. An aspect ratio (dividing a diameter by a thickness) of the flat particles is not smaller than 10: e.g., copper flakes can be used. A mixture percentage of the flat particles in the copper powder is preferably 5 mass % to 30 mass % in the copper based powder; or 10 mass % to 60 mass % in the iron-copper based powder. The granular particles and the flat particles in the copper based powder are, for example formed with a maximum diameter of the flat particles at not smaller than 1 μm and not larger than 100 μm; and with an average particle diameter of the granular particles at not smaller than 5 μm and not larger than 100 μm. In the iron-copper based powder, the iron powder is formed with an average particle diameter not smaller than an average particle diameter of the copper powder.

Figure 4:
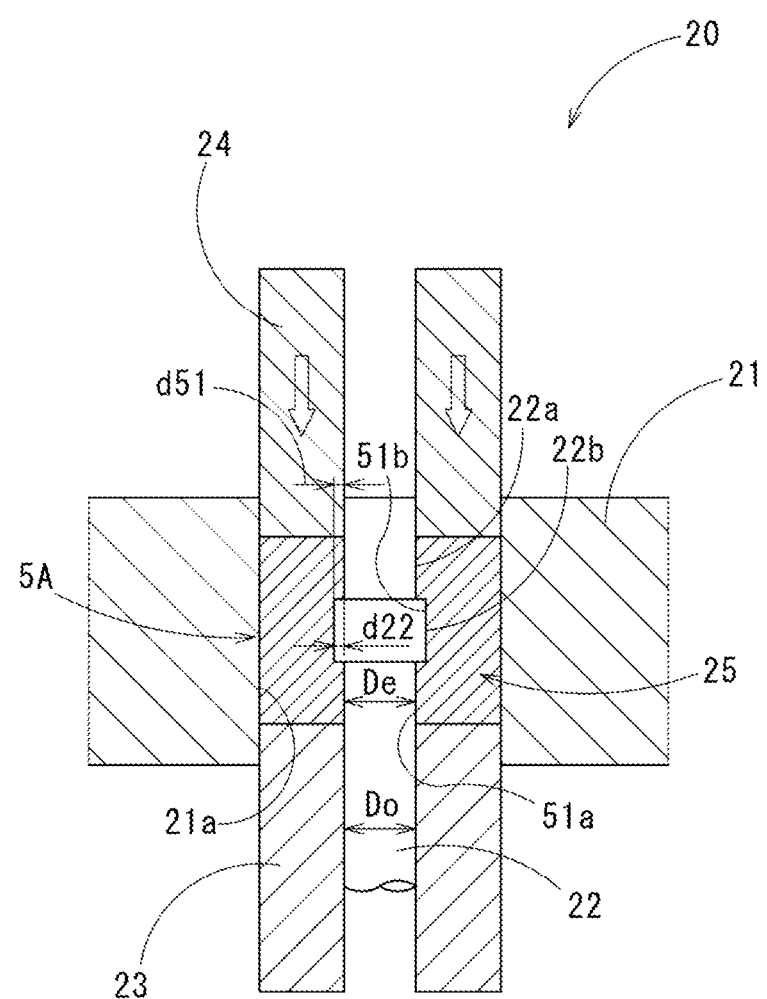
FIG. 4 is a vertical sectional view schematically showing a state in which material powder is filled in a forming die.
Figure 5:
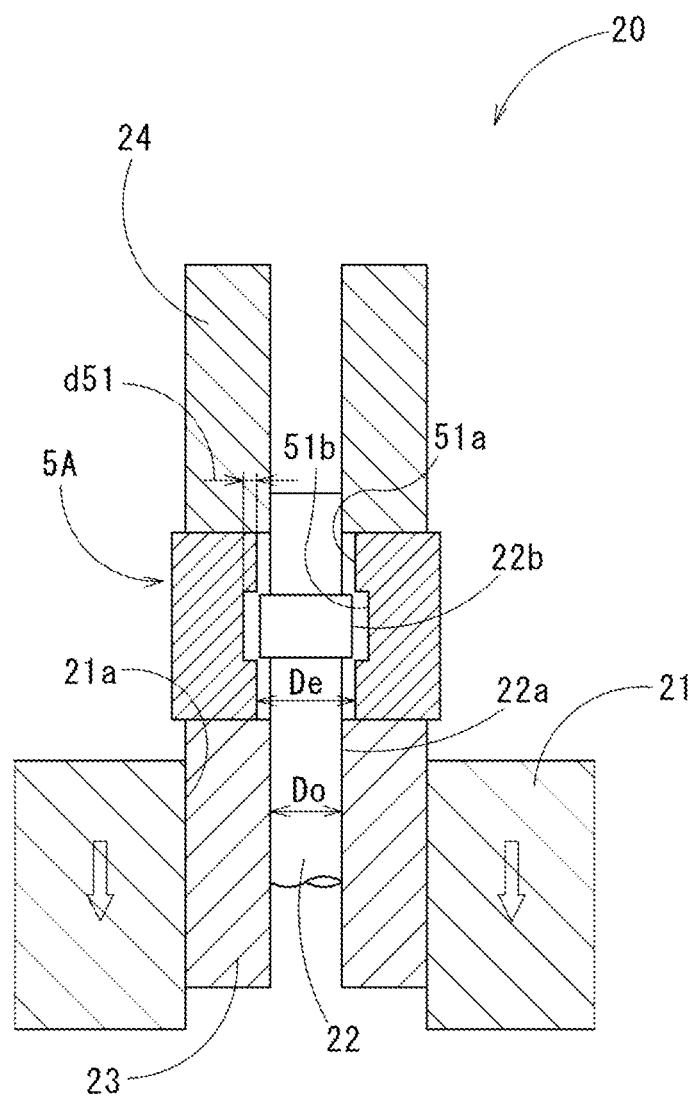
FIG. 5 is a vertical sectional view schematically showing a state in which a green compact is released from a forming core rod by moving a forming die plate downward, following a state shown in FIG. 4.
Figure 6:
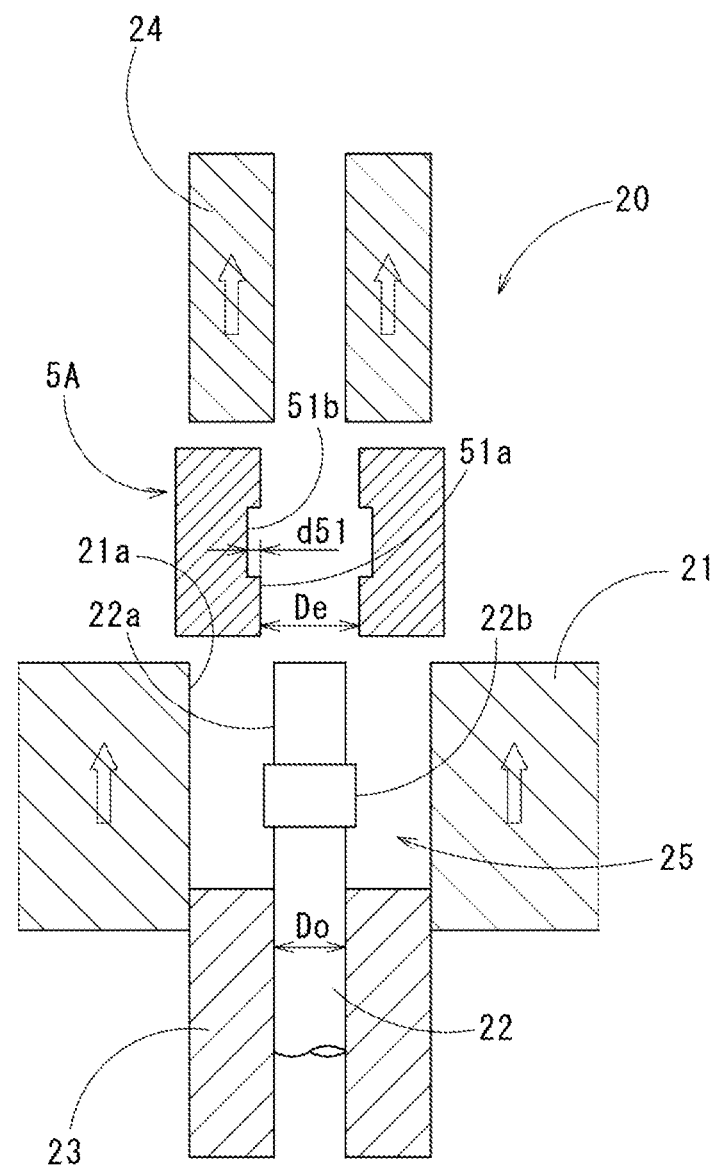
FIG. 6 is a vertical sectional view schematically showing a state in which the green compact is taken out by moving the forming die plate upward, following a state shown in FIG. 5.

In the green-compact forming process (S1), as shown in FIG. 4 to FIG. 6, used is a forming die 20 provided with a forming die plate 21, a forming core rod 22, a forming lower punch 23, and a forming upper punch 24. In the forming die 20, a through hole 21a is cylindrically formed on the forming die plate 21: the forming core rod 22 inserted in a center of the through hole 21a is formed in a columnar shape as a whole, with a large-diameter surface 22b formed on at least a part of an outer circumferential surfaces 22a so as to be protruded outward in a radial direction than the other parts. A height gap d22 between the outer circumferential surface 22a and the large-diameter surface 22b is set to be not smaller than 0.1% and not larger than 1.0% of an outer diameter Do of the outer circumferential surface 22a. The forming lower punch 23 inserted between the through hole 21a of the forming die plate 21 and the outer circumference surface 22a of the forming core rod 22 from a bottom is formed cylindrically: the forming die plate 21, the forming core rod 22, and the forming lower punch 23 form a cylindrical forming tubular space 25.

In the first embodiment, the forming core rod 22 structures a forming inner die of the present invention.

As shown in FIG. 4, a green compact 5A is formed by: pouring a prescribed amount of the material powder into the forming tubular space 25 from an upper part; inserting the cylindrical forming upper punch 24 into the forming tubular space 25 so as to reduce a distance between the forming lower punch 23 and the forming upper punch 24; and pressing the material powder at 150 to 400 MPa. At this moment, a depressed surface 51b is formed on an inner circumferential surface of the green compact 5A by the large-diameter surface 22b, which is designed to protrude into a portion of the inner circumferential surface of the green compact 5A so that the depressed surface 51b extends further outward in the radial direction from other portions of the inner circumferential surface of the green compact 5A. In addition, protruded surfaces 51a are formed adjacent to the depressed surface 51b. That is to say, on the inner circumferential surface of the green compact 5A, the depressed surface 51b and the protruded surfaces 51a are adjacently formed so as to create a height gap corresponding to the shapes of the outer circumferential surface 22a and the large-diameter surface 22b of the forming core rod 22: the depressed surface 51b is set to be not smaller than 0.1% and not larger than 1.0% of an inner diameter De of the protruded surfaces 51a.

As described above, after forming the green compact 5A between the forming die plate 21 and the forming core rod 22, moving the forming die plate 21 downward as shown in FIG. 5 and releasing restraint of the forming die plate 21 (a decompression), small spring back is generated on the green compact 5A, so that a space is generated between the forming core rod 22 and the green compact. In this state, as shown in FIG. 6, moving the forming die plate 21 upward to return to an original position, the forming core rod 22 can be easily drawn out from the inside of the green compact 5A (it is released from the die). The large-diameter surface 22b is formed on the outer circumferential surface 22a of the forming core rod 22 to be enlarged than the other parts though, because the protruding amount (the height gap d22) is small, it is possible to draw (release from the die) the green compact 5A out from the forming core rod 22 easily by the space formed between the forming core rod 22 and the green compact 5A by the spring back. A height gap "d51" between the protruded surfaces 51a and the depressed surface 51b on the inner circumferential surface of the green compact 5A is slightly larger than that in a state of the restraint by the forming die plate 21 owing to the spring back: the inner diameter De of the protruded surfaces 51a is also larger than that in the state of the restraint by the forming die plate 21.

In the green-compact forming process (S1), vibrating the material powder in a state of being filled in the forming tubular space 25 of the forming die 20, the flat particles are apt to gather on a surface layer part. In a case of the copper based powder, the flat particles and the granular particles closely gather on the surface layer part, a proportion of the granular particles is increased toward the inside, and the flat particles gather in a vicinity of the outer circumferential surface 22a and the large-diameter surface 22b of the forming core rod 22. Therefore, in a case of the iron-copper based powder, the surface layer part is rich in copper, and a proportion of iron is increased toward the inside.

Subsequently, in the sintering process (S2), a sintered body 5B having a surface opening percentage higher than 10% is formed, by sintering the green compact 5A at temperature 800 to 950° C. An average circle-equivalent diameter of opening parts of pores is not smaller than 5 μm and not larger than 30 μm. In the sintering process (S2), on an inner circumferential surface of the sintered body 5B, protruded surfaces 52a are formed on a part corresponding to the protruded surfaces 51a of the green compact 5A; and the oil supply surface 4 having a surface opening percentage higher than 10% is formed on a depressed surface that was the depressed surface 51b of the green compact 5A. A height gap "d0" between the protruded surfaces 52a and the oil supply surface 4 of the sintered body 5B is set not to be smaller than 0.1% and not larger than 1.0% of an inner diameter Df of the protruded surfaces 52a; and an area rate of the protruded surfaces 52a is set not to be smaller than 0.4 and not larger than 0.98 on the inner circumferential surface of the sintered body 5B, in the green-compact forming process (S1).

After the sintering process (S2), the sintered body 5B is reformed in a sizing die 30 in the sizing process (S3). By compressing the protruded surfaces 52a on the inner circumferential surface of the sintered body 5B, the sliding surfaces 3 are formed, so that the oil-impregnated bearing 1 having the oil supply surface 4 and the sliding surfaces 3 is manufactured.

Figure 7:
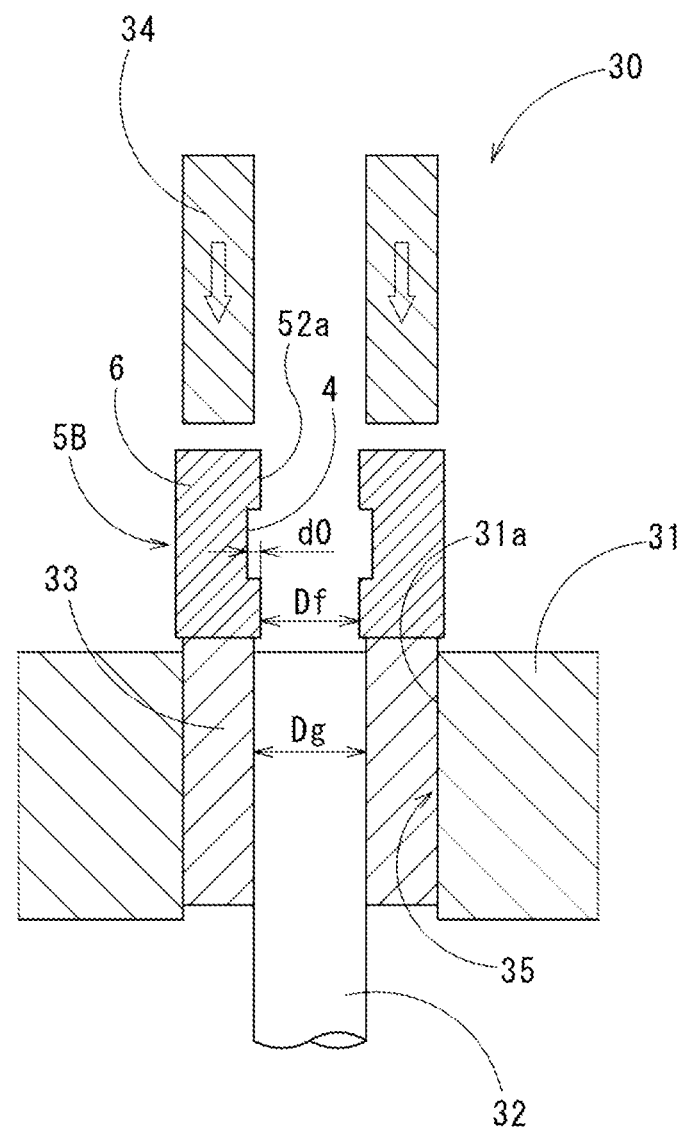
FIG. 7 is a vertical sectional view schematically showing a state in which a sintered body is arranged in a sizing die.
Figure 8:
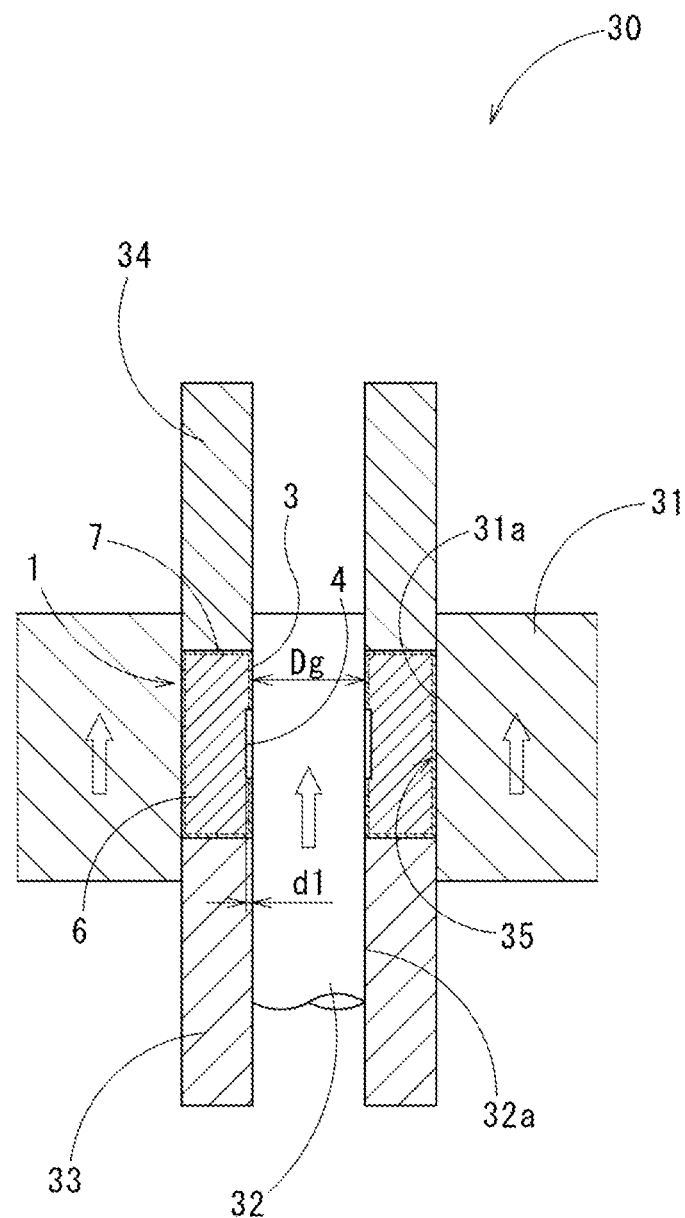
FIG. 8 is a vertical sectional view schematically showing a state in which the sintered body is putted into a sizing tubular space between a sizing die plate and a sizing core rod for compressing by moving a sizing upper punch downward, following a state shown in FIG. 7.

As shown in FIG. 7 and FIG. 8, the sizing die 30 reforms a size of an outer shape of the sintered body 5B, is provided with a sizing die plate 31, a sizing core rod 32, a sizing lower punch 33 and a sizing upper punch 34 as in the forming die 20. A sizing tubular space 35 is formed by an inner circumferential surface of a through hole 31a in the sizing die plate 31 and an outer circumferential surface 32a of the sizing core rod 32. A surface (the inner circumferential surface) of the through hole 31a in the sizing die plate 31, the outer circumferential surface 32a of the sizing core rod 32, end surfaces of the sizing lower punch 33 and the sizing upper punch 34, which are in contact with the sintered body 5B, are finished to be a smooth surface. The outer circumferential surface 32a of the sizing core rod 32 is formed with an outer diameter Dg larger than the protruded surfaces 52a of the sintered body 5B and smaller than the oil supply surface 4 which is a depressed surface.

As shown in FIG. 7, arranging the sintered body 5B on the sizing die plate 31 of the sizing die 30, moving the sizing upper punch 34 downward so as to hold the sintered body 5B in the axial direction between the sizing upper punch 34 and the sizing lower punch 33 by reducing a distance between the sizing upper punch 34 and the sizing lower punch 33; then as shown in FIG. 8, putting the sintered body 5B into the sizing tubular space 35 between the inner circumferential surface of the through hole 31a of the sizing die plate 31 and the outer circumferential surface 32a of the sizing core rod 32 and compressing therein, so that the outer shape of the sintered body 5B is compressed and plastically flown in the radial direction and the axial direction between the inner circumferential surface of the through hole 31a of the sizing die plate 31 and the outer circumferential surface 32a of the sizing core rod 32, and between the sizing upper punch 34 and the sizing lower punch 33: the shape thereof is finished to have a product size.

Since the outer diameter Dg of the outer circumferential surface 32a of the sizing core rod 32 is formed with the outer diameter larger than the protruded surfaces 52a of the sintered body 5B and smaller than the oil supply surface 4 which is a protruded surface, the oil supply surface 4 on the inner circumferential surface of the sintered body 5B is not compressed, only the protruded surface 52 is compressed and plastically flown outward in the radial direction. By compressing the protruded surfaces 52a of the sintered body 5B and rubbing the protruded surfaces 52a with the outer circumferential surface 32a of the sizing core rod 32, the pores opening at the surface are closed. As a result, the dense layers 7 in a state in which the pores are closed are formed on a whole surface of the protruded surfaces 52a, and the sliding surfaces 3 having the surface opening percentage lower than 10% are formed: so that manufactured is the oil-impregnated sintered bearing 1 having the sliding surfaces 3 and the oil supply surface 4 in which the height gap "d1" therebetween is not smaller than 0.01% and not larger than 0.5% of the inner diameter D1 of the sliding surfaces 3. The solid lubricant which was mixed during forming exists in a range of not less than 2.0% and not more than 20% in an area rate (a rate per a unit area). Since some of the pores are closed, the average circle-equivalent diameter of the opening parts of the pores at the sliding surfaces 3 is not larger than 20 μm. Since the sliding surfaces 3 are formed on the whole of the surfaces of the protruded surfaces 52a, an area rate "a" of the sliding surfaces 3 to the inner circumferential surface of the bearing 2 is not less than 0.4 and not more than 0.98. In addition, the oil is at last impregnated in the oil-impregnated sintered bearing 1.

In the oil-impregnated sintered bearing 1 manufactured as above, the inner circumferential surface is the bearing hole 2, and rotatably supports the inserted shaft 11. In this case, the oil supply surface 4 is formed on the inner circumferential surface of the bearing hole 2, the other surfaces than the oil supply surface 4 are the sliding surfaces 3 supporting the shaft 11: a clearance larger than the size of the height gap "d1" between the oil supply surface 4 and the sliding surfaces 3 is formed between the bottom surface of the oil supply surface 4 and the outer circumferential surface of the shaft 11. In the sliding surfaces 3, the surface opening percentage of the pores is small due to the dense layers 7 as not more than 10% as described above, the average circle-equivalent diameter of the opening parts of the pores is not larger than 20 μm: and the oil supply surface 4 has the surface opening percentage higher than 10%.

Accordingly, when the shaft 11 is rotated, the oil is exuded from the oil supply surface 4 having the large surface opening percentage and supplied between the shaft 11 and the sliding surfaces 3. Since on the sliding surfaces 3 the surface opening percentage is not higher than 10% and the average circle-equivalent diameter of the opening parts of the pores is small as not larger than 20 μm, the oil is not impregnated to the interior, and forms the oil film between the sliding surfaces 3 and the shaft 11 so as to support the shaft 11. In this case, if the surface opening percentage of the sliding surfaces 3 exceeds 10% or if the average circle-equivalent diameter of the opening parts of the pores exceeds 20 μm, since the oil cannot be maintained and flows into the interior of the bearing, the oil film between the shaft 11 and the sliding surfaces 3 is reduced, so that the bearing seizure may be occurred. If the surface opening percentage at the oil supply surface 4 is not more than 10%, it is difficult to supply the oil sufficiently to the sliding surfaces 3 from the interior. When the surface opening percentage at the oil supply surface 4 is higher than 10% and the average circle-equivalent diameter of the opening parts of the pores is not less than 5 μm and not more than 30 μm, it is possible to supply the oil sufficiently to the sliding surfaces 3.

In the present embodiment, since the oil is sufficiently supplied between the sliding surfaces 3 and the shaft 11, the oil film thereof reduces friction resistance and the sliding characteristic can be improved.

If the height gap "d1" between the sliding surfaces 3 and the oil supply surface 3 is smaller than 0.01% of the inner diameter D1 of the sliding surfaces 3, the oil supply surface 4 is also sealed by sizing the protruded surfaces 52a to be the sliding surfaces 3, so that there is a possibility that the oil cannot be sufficiently supplied. If the height gap "d1" between the sliding surfaces 3 and the oil supply surface 4 is more than 0.5% of the inner diameter D1 of the sliding surfaces 3; as the height gap "d1" is large, it is difficult to form the oil supply surface 4 at the middle part in a longitudinal direction of the bearing hole 2.

In the oil-impregnated sintered bearing 1, since the sliding surfaces 3 and the oil supply surface 4 are formed adjacent to each other in the axial direction in the inner circumferential surface of the bearing hole 2, and since the area rate "a" of the sliding surfaces 3 is set to be not less than 0.4 and not more than 0.98; even if the shaft 11 is in contact at any position of the inner circumferential surface of the bearing hole 2, it is in contact in a range of ("a"×100)% of the length "b1" of the bearing hole 2; as a result, the shaft 11 can be stably supported. Furthermore, in the oil-impregnated sintered bearing 1, the oil supply surface 4 is formed between the sliding surfaces 3, in other words, the sliding surfaces 3 are formed at both the ends of the oil supply surface 4; so that the oil is efficiently supplied from the oil supply surface 4 to the sliding surfaces 3, and it is possible to reduce leakage to end surfaces. As a result, it is possible to reliably prevent the oil from running out by synergistic effects of them, the oil-impregnated sintered bearing 1 can show excellent sliding performance for a long time.

Figure 9:
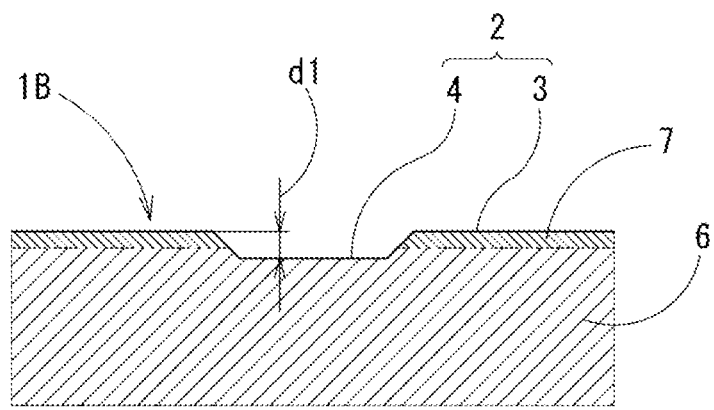
FIG. 9 is a sectional schematic view in a vicinity of an inner circumferential surface of a bearing hole showing a modified example of a connecting part between sliding surfaces and an oil supply surface of the bearing hole in the oil-impregnated sintered bearing of the first embodiment of the present invention.

In the oil-impregnated sintered bearing 1 of the first embodiment, as shown in the part (b) of FIG. 2, side surfaces connecting the bottom surface of the oil supply surface 4 and the sliding surfaces 3 are formed perpendicular to the bottom surface of the oil supply surface 4: as an oil-impregnated sintered bearing 1B shown in FIG. 9, side surfaces connecting the bottom surface of the oil supply surface 4 and the sliding surfaces 3 can be formed to be tapered surfaces gradually reduced in a diameter.

In the present embodiment shown in FIG. 1, the sliding surfaces 3 and the oil supply surface 4 are formed to be a ring shape; it may be formed to be a helical shape around an axis of the bearing hole 2.

Second Embodiment

An oil-impregnated sintered bearing of a second embodiment is also a cylindrical bearing formed from a sintered body of metal powder, in which a sliding surface 103 supporting the outer circumferential surface 11a of the shaft 11 and oil supply surfaces 104A and 104B are formed on an inner circumferential surface of a bearing hole 102: the oil supply surfaces 104A and 104B have a larger diameter than that of the sliding surface 103; the oil supply surfaces 104A and 104B form gaps between the outer circumferential surface 11a of the shaft 11: the sliding surface 103 and the oil supply surfaces 104A and 104B are adjacent to each other in an axial direction of the bearing hole 102.

Figure 10:
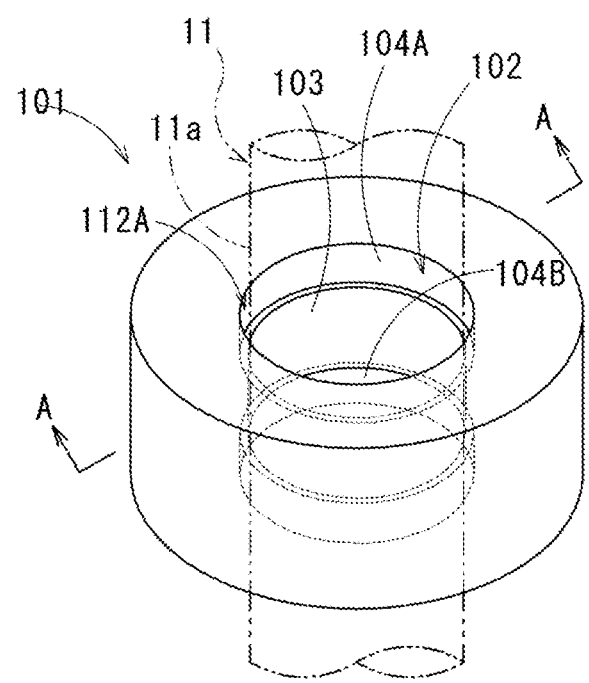
FIG. 10 is a schematic view of an oil-impregnated sintered bearing of a second embodiment of the present invention: the part (a) is a perspective view thereof, and the part (b) is a sectional view of an inner circumferential surface of a bearing hole viewed along the line A-A in the part (a).
Figure 10:
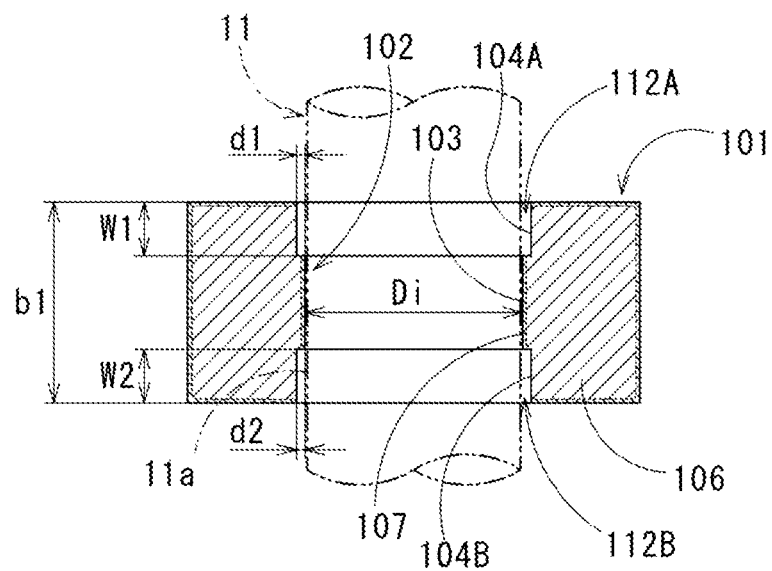

The bearing hole 102 rotatably supports the shaft 11 inserted therein; the sliding surface 103 is formed with slightly a larger inner diameter than an outer diameter of the shaft 11. The inner diameter D1 of the sliding surface 103 is not smaller than 1 mm and not larger than 30 mm: a gap is formed between the sliding surface 103 and the shaft 11 at not smaller than 0.05% and not larger than 0.6% of the inner diameter D1 of the sliding surface 103, for example. The oil supply surfaces 104A and 104B are formed by depressed surfaces having a larger radius of curvature than that of the sliding surface 103, opening on ends in the axial direction of the inner circumferential surface of the bearing hole 102. In the example shown in FIG. 10 and FIG. 11, the sliding surface 103 is formed at a middle of an oil-impregnated sintered bearing 101 in a direction of the length b1 (the axial direction), that is, a middle part of the inner circumferential surface of the bearing hole 102: the oil supply surfaces 104A and 104B are formed adjacent to both ends thereof. In the example shown in FIG. 10 and FIG. 11, a width W1 of the upper oil supply surface 104A and a width W2 of the lower oil supply surface 104B, which are formed at both end parts of the bearing hole 102, are formed to be the same size: these widths W1 and W2 are formed with a constant width along a circumferential direction. The height gap "d1" between the sliding surface 103 and the upper oil supply surface 104A and a height gap "d2" between the sliding surface 103 and the lower oil supply surface 104B are both formed to be not less than 0.5% and not more than 15% of the inner diameter D1 of the sliding surface 103.

It is enough for the oil supply surface to be formed on at least one end (an upper side or a lower side) of the ends of the bearing hole 102. As in the oil-impregnated sintered bearing 101 of the present embodiment, in a case in which the oil supply surfaces 104A and 104B are formed on both the ends of the bearing hole 102, the upper oil supply surface 104A and the lower oil supply surface 104B may be formed so that the width W1 and the width W2 are different.

The oil-impregnated sintered bearing 101 is formed from a sintered body of metal powder, so that it is formed of a porous layer 106 in which pores are formed inside, the pores open at bottom surfaces of the oil supply surfaces 104A and 104B on the inner circumferential surface of the bearing hole 102: a surface opening percentage of the pores is more than 10% at the bottom surfaces of the oil supply surfaces 104A and 104B. The sliding surface 103 is formed from the dense layer 107 in which the pores are sealed: a surface opening percentage is not more than 10% at a surface of the sliding surface 103, preferably not more than 5%, more preferably not more than 3%. These surface opening percentages of the pores are area rates of opening parts of the pores in an unit area at the inner circumferential surface of the bearing hole 102.

An average opening diameter of the pores opening at the sliding surface 103 is not more than 20 μm in an average circle-equivalent diameter, preferably not smaller than 5 μm. In the oil supply surfaces 104, an average circle-equivalent diameter of the opening parts of the pores is preferably not smaller than 5 μm and not larger than 30 μm.

When an area rate of the sliding surface 3 is "a" in regard to a whole area of the inner circumferential surface of the bearing hole 102 as 1, the area rate "a" is not less than 0.4 and not more than 0.98. In this case, when the length of the bearing hole 102 is "b1" (in the present embodiment, it is the same as the length "b1" of the oil-impregnated sintered bearing 101), the shaft 11 is in contact with the sliding surface 103 in a range of ("a"×100) % of the length "b1" of the bearing hole 102 by being inserted into the bearing hole 102 to be in contact with the inner circumferential surface.

As shown in the flow process chart shown in FIG. 3 explained for the first embodiment, the method of manufacturing the oil-impregnated sintered bearing 101 also includes: the green-compact forming process (S1) forming a cylindrical green compact by filling material powder in a forming die and compressing it, the sintering process (S2) forming a sintered body sintering the green compact, and the sizing process (S3) forming a bearing hole by resizing the sintered body after the sintering process (S2) by compressing. Materials are the same as that used in the first embodiment and the explanation thereof will be omitted.

Figure 12:
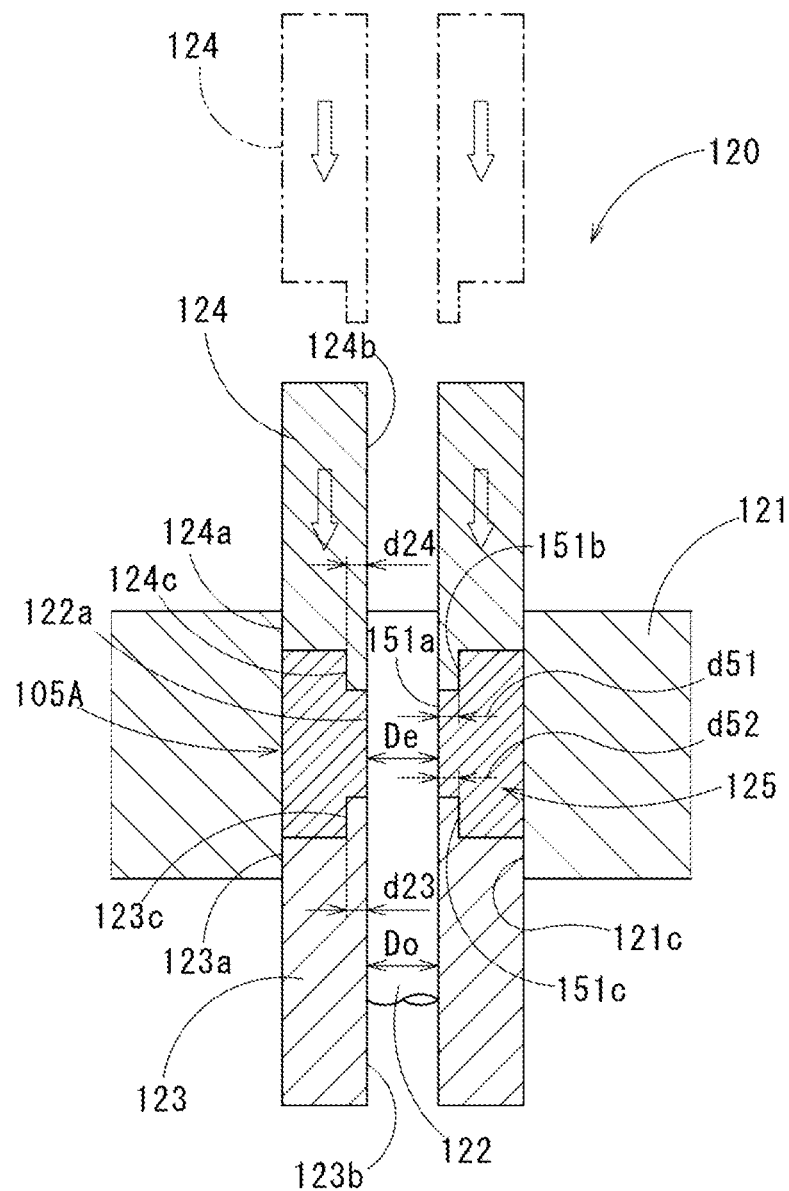
FIG. 12 is a vertical sectional view schematically showing a state in which material powder is filled in a forming die.
Figure 13:
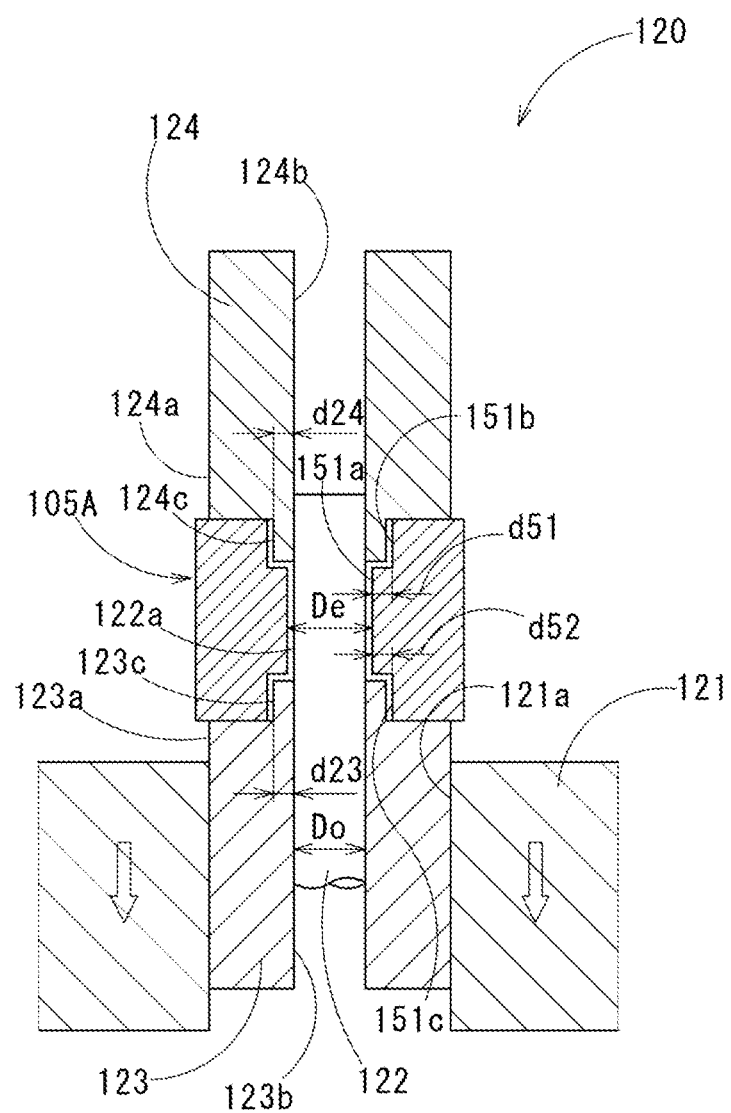
FIG. 13 is a vertical sectional view schematically showing a state in which a green compact is released from a forming core rod by moving a forming die plate downward, following a state shown in FIG. 12.
Figure 14:
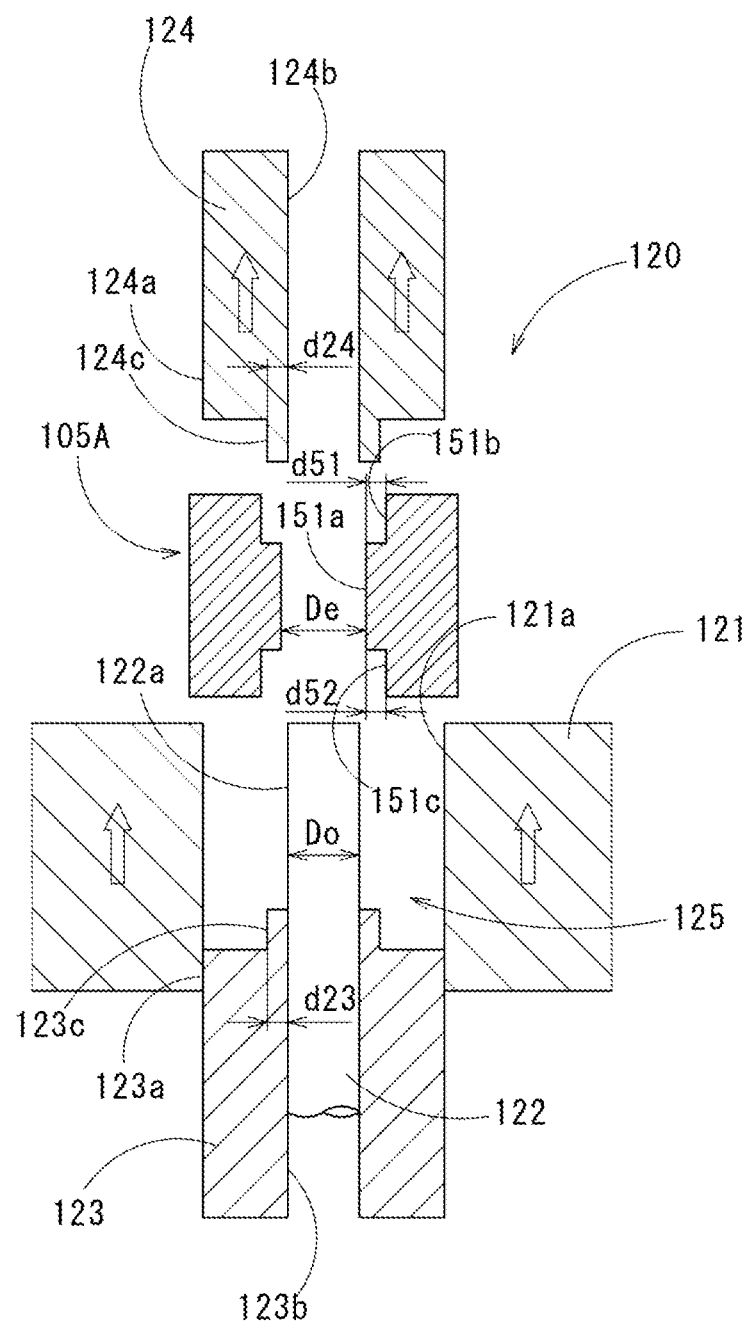
FIG. 14 is a vertical sectional view schematically showing a state in which the green compact is drawn out by moving a forming upper punch and the forming die plate upward, following a state shown in FIG. 13.

In the green-compact forming process (S1), as shown in FIG. 12 to FIG. 14, used is a forming die 120 provided with a forming die plate 121, a forming core rod 122, a forming lower punch 123, and a forming upper punch 124. In the forming die 120, a forming through hole 121a is cylindrically formed on the forming die plate 121: the forming core rod 122 inserted in a center of the forming through hole 121a is formed in a column shape as a whole.

A forming tubular space 125 is formed between an inner circumferential surface of the forming through hole 121a of the forming die plate 121 and an outer circumferential surface 122a of the forming core rod 122: the forming lower punch 123 is formed to have a tubular shape as a whole, and inserted into the forming tubular space 125 from below; so that an outer circumferential surface 123a thereof is provided to be engaged with an inner circumferential surface of the forming through hole 121a of the forming die plate 121a, and an inner circumferential surface 123b thereof is provided to be engaged with the outer circumferential surface 122a of the forming core rod 122. On an upper end part of the outer circumferential surface 123a of the forming lower punch 123, a small-diameter surface 123c is formed to be inwardly depressed in a radial direction from the other parts: a radial difference d23 between the small-diameter surface 123c and the inner circumferential surface 123b is not less than 1% and not more than 15.5% of an inner diameter of the inner circumferential surface 123b (an outer diameter Do of the outer circumferential surface 122a of the forming core rod 122).

The forming upper punch 124 inserted into the forming tubular space 125 from an upper part is also formed as a tubular shape as a whole: an outer circumferential surface 124a thereof is formed to be engaged with the inner circumferential surface of the forming through hole 121a of the forming die plate 121, and an inner circumferential surface 124b thereof is formed to be engaged with the outer circumferential surface 122a of the forming core rod 122. On a lower end part of the outer circumferential surface 124a of the forming upper punch 124, a small-diameter surface 124c is formed to be inwardly depressed in the radial direction from the other parts: a radial difference d24 between the small-diameter surface 124c and the inner circumferential surface 124b is not less than 1% and not more than 15.5% of the inner diameter of the inner circumferential surface 124b (an outer diameter Do of the outer circumferential surface 122a of the forming core rod 122). In the present embodiment, the radial difference d23 of the forming lower punch 123 and the radial difference d24 of the forming upper punch 124 are formed substantially to be the same size.

In a case of the second embodiment, a forming inner die of the present invention is formed from the upper end part of the forming lower punch 123 having the small-diameter surface 123c, the lower end part of the forming upper punch 124 having the small-diameter surface 124c, and the forming core rod 122.

As shown in FIG. 12, filling the material powder into the forming tubular space 125 with a prescribed amount from the upper part in a state in which the forming upper punch 124 is elevated; then compressing the material powder at 150 MPa to 400 MPa by inserting the forming upper punch 124 from the upper part of the forming tubular space 125 so as to reduce a distance between the forming lower punch 123 and the forming upper punch 124, so that a green compact 105A is formed. On both ends of an inner circumferential surface of the green compact 105A, by the small-diameter surface 123c of the forming lower punch 123 and the small-diameter surface 124c of the forming upper punch 124, depressed surfaces 151b and 151c having larger radius curvatures than that of the other parts are formed on both ends in an axial direction of the inner circumferential surface of the green compact 105A; and by the outer circumferential surface 122a of the forming core rod 122, a protruded surface 151a is formed to be adjacent to the depressed surface 151b and the depressed surface 151c. That is to say, on the inner circumferential surface of the green compact 105A, the depressed surface 151b, the protruded surface 151a and the depressed surface 151c are adjacently formed with height gaps corresponding to the shapes of the outer circumferential surface 122a of the forming core rod 122, the small-diameter surface 123c of the forming lower punch 123 and the small-diameter surface 124c of the forming upper punch 124: a height gap d51 between the protruded surface 151a and the depressed surface 151b and a height gap d52 between the protruded surface 151a and the depressed surface 151c are formed to be not less than 1% and not more than 15.5% of an inner diameter De of the protruded surface 151a.

After forming the green compact 105A among the forming die plate 121, the forming core rod 122, the forming lower punch 123 and the forming upper punch 124, moving the forming die plate 121 downward as shown in FIG. 13 so as to release restraint by the forming die plate 121 (a decompression), a small spring back is occurred on the green compact 105A, so that a space is among between the inner circumferential surface of the green compact 105A, the outer circumferential surface 122a of the forming core rod 122, the small-diameter surface 123c of the forming lower punch 123 and the small-diameter surface 124c of the forming upper punch 124. In this state, as shown in FIG. 14, moving the forming upper punch 124 upward so as to be drawn out from the inside of the green compact 105A and moving the forming die plate 121 upward so as to be placed at the original position back, the forming core rod 122 can be easily drawn out from the inside of the green compact 105A, so that the green compact 105A can be released from the forming die 120.

As described above, in the forming die 120, forming the small-diameter surface 123c having a reduced diameter at the upper end part of the forming lower punch 123, and forming the small-diameter surface 124c having a reduced diameter at the lower end part of the forming upper die 124, so that the depressed surfaces 151b and 151c are formed that open at the end parts of the green compact 105A in the axial direction: accordingly, the green compact 105A can be easily released from the forming die 120 even though the depressed surfaces 151b and 151c are formed with so large gaps as the height gaps d51 and d52 in regard to the protruded surface 151a are 1.5% or larger of the inner diameter De of the protruded surface 151a. In addition, the height gaps d51 and d52 of the depressed surface 151b and the depressed surface 151c to the protruded surface 151a on the inner circumferential surface of the green compact 105A are slightly increased because of the spring back comparing to the restrained state by the forming die plate 121.

In the green-compact forming process (S1), the flat powder is apt to gather to the surface layer part by vibrating the material powder filled in the forming tubular space 125 of the forming die 120. In a case of the copper based powder, the flat powder and the granular powder are closely gathered at the surface layer part; a proportion of the granular powder is increased toward the inside; and the flat powder is gathered in vicinities of the outer circumferential surface 122a of the forming core rod 122, the small-diameter surface 123c of the forming lower punch 123 and the small-diameter surface 124c of the forming upper punch 124. As a result, in a case of iron-copper based powder, the surface layer part is rich with copper and a proportion of iron is increased toward the inside.

Subsequently, in the sintering process (S2), a sintered body 105B in which the surface opening percentage is larger than 10% is formed by sintering the green compact 105A at temperature 800 to 950° C. At this time, the average circle-equivalent diameter of the opening parts of the pores is not smaller than 5 μm and not larger than 30 μm. In this sintering process (S2), on an inner circumferential surface of the sintered body 105B, a protruded surface 152a is formed on the protruded surface 151a part of the green compact 105A: and oil supply surfaces 104A and 104B in which the surface opening percentage is larger than 10% are formed on a depressed surface that was the depressed surface 151b part and a depressed surface that was the depressed surface 151c of the green compact 105A. In the green-compact forming process (S1), a height gap "d11" between the protruded surface 152a and the upper oil supply surface 104A and a height gap "d12" between the protruded surface 152a and the lower oil supply surface 104B in the sintered body 105B are set to have a size not smaller than 1% and not larger than 15.5% of an inner diameter Df of the protruded surface 152a: and the protruded surface 152a is set to have an area rate not smaller than 0.4 and not larger than 0.98 in an inner circumferential surface of the sintered body 105B.

After the sintering process (S2), in a sizing process (S3), the sintered body 105B is reformed in a sizing die 130. At this time, a sliding surface 103 is formed by compressing the protruded surface 152a on the inner circumferential surface of the sintered body 105B, so that the oil-impregnated sintered bearing 101 having the oil supply surfaces 104A and 104B and the sliding surface 103 is manufactured.

Figure 15:
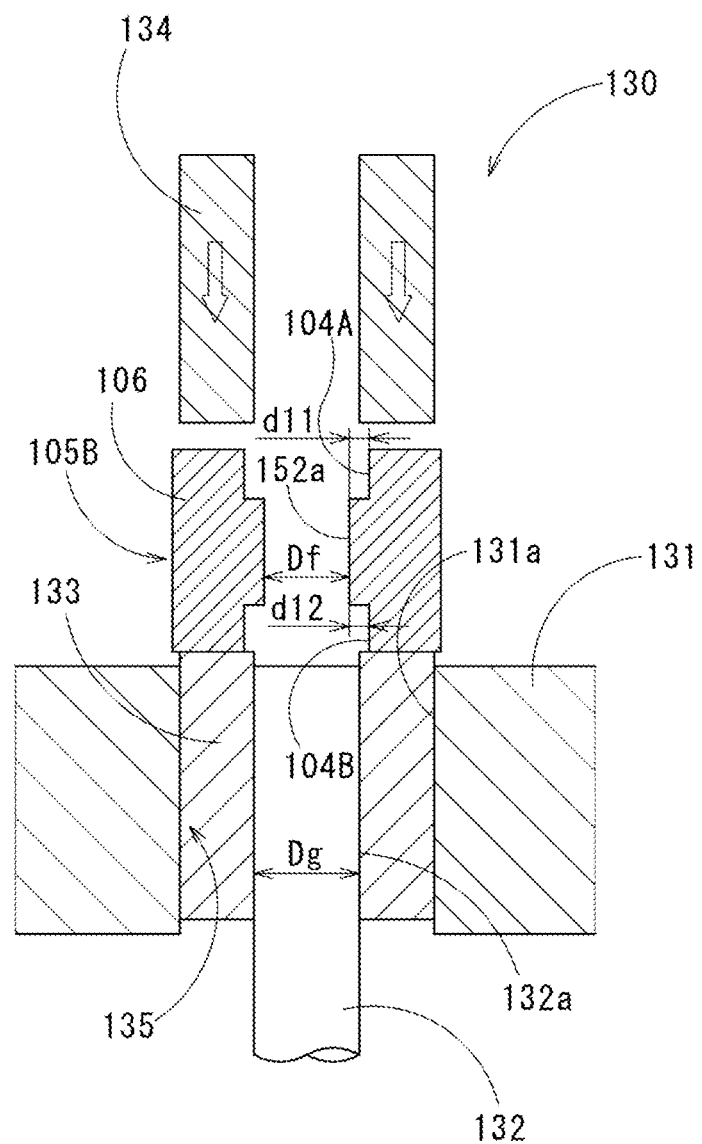
FIG. 15 is a vertical sectional view schematically showing a state in which a sintered body is arranged in a sizing die.
Figure 16:
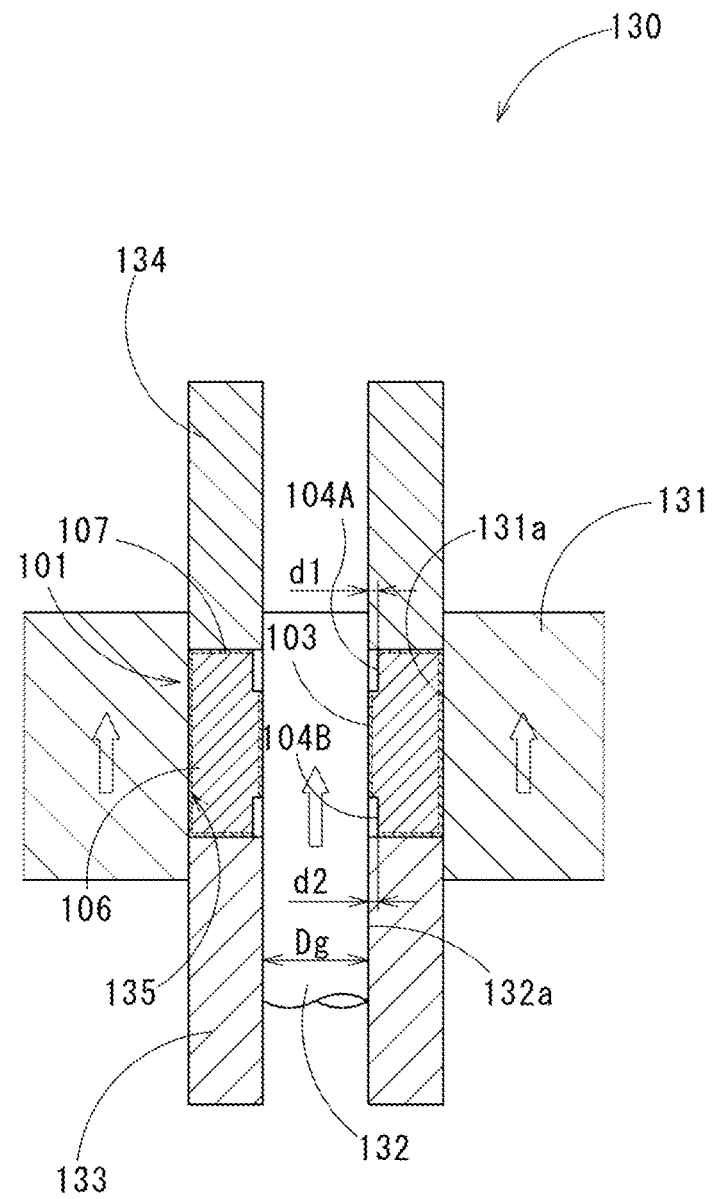
FIG. 16 is a vertical sectional view schematically showing a state in which a sizing upper punch is moved downward so that the sintered body is put into a sizing tubular space between a sizing die plate and a sizing core rod and compressed, following a state shown in FIG. 15.

The sizing die 130 reforms a size of an outer shape of the sintered body 105B as shown in FIG. 15 and FIG. 16, and is provided with a sizing die plate 131 having a sizing through hole 131a, a sizing core rod 132 inserted in a center of the sizing through hole 131a, a sizing lower punch 133 inserted into a sizing tubular space 135 formed between the sizing die plate 131 and the sizing core rod 132 from the bottom, and a sizing upper punch 134 inserted into the sizing tubular space 135 from the above. A surface (an inner circumferential surface) of the sizing through hole 131a of the sizing die plate 131, an outer circumferential surface 132a of the sizing core rod 132, and end surfaces of the sizing lower punch 133 and the sizing upper punch 134 that are in contact with the sintered body 105B are formed to be smooth surfaces. The outer circumferential surface 132a of the sizing core rod 132 is formed with an outer diameter Dg which is larger than the protruded surface 152a of the sintered body 105B and smaller than the oil supply surfaces 104A and 104B which are depressed surfaces.

As shown in FIG. 15, in a state in which the sintered body 105B is arranged on the sizing die plate 131 of the sizing die 130, moving the sizing upper punch 134 downward so as to reduce a distance between the sizing upper punch 134 and the sizing lower punch 133, so that the sintered body 105B is held between the sizing upper punch 134 and the sizing lower punch 134 in the axial direction; then as shown in FIG. 16, the sintered body 105B is pressed into the sizing tubular space 135 between the inner circumferential surface of the sizing through hole 131a of the sizing die plate 131 and the outer circumferential surface 132a of the sizing core rod 132 and compressed, so that the outer shape of the sintered body 105B is compressed in the radial direction and the axial direction between the inner circumferential surface of the sizing through hole 131a of the sizing die plate 131 and the outer circumferential surface 132a of the sizing core rod 132 and between the sizing upper punch 134 and the sizing lower punch 133: as a result, a shape thereof is finished to be a product size.

At this time, the outer diameter Dg of the outer circumferential surface 132a of the sizing core rod 132 is formed to be an outer diameter larger than the protruded surface 152a of the sintered body 105B and smaller than the oil supply surfaces 104A and 104B which are depressed surfaces: so that the oil supply surfaces 104A and 104B on the inner circumferential surface of the sintered body 105B are not compressed, but only the protruded surface 152a is compressed and plastically flown in the radial direction outwardly. The protruded surface 152a of the sintered body 105B is compressed as described above, and the outer circumferential surface 132a of the sizing core rod 132 and the protruded surface 152a are rubbed each other: so that the pores opening at the surface are sealed. As a result, a dense layer 107 in which pores are sealed is formed on a whole surface of the protruded surface 152a, thereby forming the sliding surface 103 in which the surface opening percentage is not larger than 10%, so that manufactured is the oil-impregnated sintered bearing 101 having the sliding surface 103 and the oil supply surfaces 104A and 104B in which the height gaps "d1" and "d2" are formed to be not smaller than 0.5% and not larger than 15% of the inner diameter D1 of the sliding surface 103. Solid lubricant that was mixed during it was forming exists at not less than 2.0% and not more than 20% in an area rate (a rate per a unit area). Since some of the pores are sealed, the average circle-equivalent diameter is not larger than 20 µm at the opening parts of the pores on the sliding surface 103. Since the sliding surface 103 is formed on the whole surface of the protruded surface 152a, an area rate "a" of the sliding surface 103 is set to be not less than 0.4 and not more than 0.98 in regard to a whole area of the inner circumferential surface of the bearing hole 102 as 1. In addition, the oil is at last impregnated in the oil-impregnated sintered bearing 101.

In the oil-impregnated sintered bearing 101, since the height gaps "d1" and "d2" between the sliding surface 103 and the oil supply surfaces 104A and 104B are set to be large as not less than 0.5% and not more than 15% of the inner diameter D1 of the sliding surface 103; when the shaft 11 is inserted into the bearing hole 102 and in contact with the sliding surface 103, between the shaft 11 and the oil supply surfaces 104A and 104B, formed are space parts 112A and 112B with a width of at least 0.5% or more of the inner diameter D1 of the sliding surface 103. Since the space parts 112A and 112B work as oil pools, the oil can be recovered at the space parts 112A and 112B when the oil introduced between the shaft 11 and the sliding surface 103 flows out of between the shaft 11 and the sliding surface 103 while using. Moreover, the oil can be stored in the space parts 112A and 112B; thus, it is possible to prevent the oil from flowing out. Furthermore, the oil can be immediately supplied to the sliding surface 103 from the space parts 112A and 112B. Accordingly, even when it is used for a long time, it is possible to hold the oil sufficiently between the shaft 11 and the sliding surface 103 and maintain a lubrication property (a bearing property) of the sliding surface 103.

In this case, in order to ensure the size of the space parts 112A and 112B for recovering the oil, it is enough for the height gaps "d1" and "d2" between the sliding surface 103 and the oil supply surfaces 104A and 104B to be set 0.01% or larger of the inner diameter D1 of the sliding surface 103 as in the first embodiment; however, when it is set large as to be 0.5% or more, the oil supply surfaces 104A and 104B can be formed easier. The height gap d2 may be not smaller than 1% of the inner diameter D1 of the sliding surface 103. In this case, it is preferable in the green-compact forming process (S1) to set the height gap "d11" between the protruded surface 152a and the upper oil supply surface 104A and the height gap "d12" between the protruded surface 152a and the lower oil supply surface 104B of the sintered body 105B to not less than 1.5% of the inner diameter Df of the protruded surface 152a.

Meanwhile, if the height gaps "d1" and "d2" between the sliding surface 103 and the oil supply surfaces 104A and 104B exceed 15% of the inner diameter D1 of the sliding surface 103, because steps between the sliding surface 103 and the oil supply surfaces 104A and 104B are large, the oil cannot smoothly supplied to the sliding surface 103 from the oil supply surfaces 104A and 104B, so that it is difficult to supply sufficient oil for maintaining the bearing property at high load.

In the oil-impregnated sintered bearing 101, since the area rate "a" of the sliding surface is not less than 0.4 and not more than 0.98, the shaft 11 is in contact with the sliding surface 103 in a range of ("a"×100)% of the length "b1" of the bearing hole 102 even if it is in contact with any position of the inner circumferential surface of the bearing hole 102, so that the shaft 11 can be stably supported. Therefore, the oil-impregnated sintered bearing 101 can show good bearing sliding characteristic for a long time by reliably preventing the oil from running off.

Figure 11:
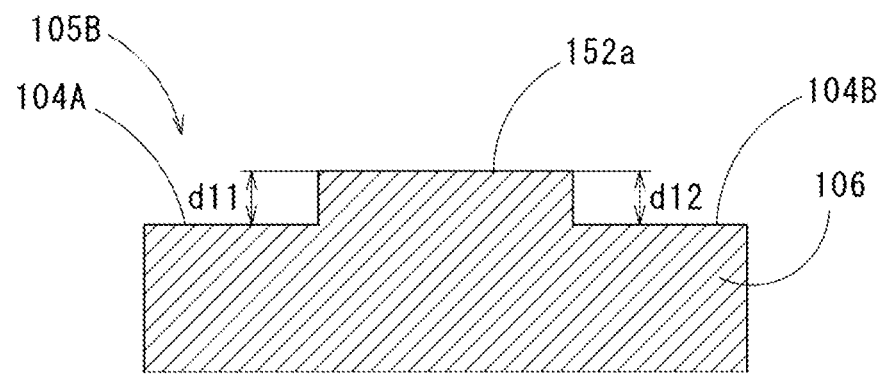
FIG. 11 is a sectional schematic view in a vicinity of the inner circumferential surface of the bearing hole in the oil-impregnated sintered bearing of the second embodiment of the present invention: the part (a) shows a state before a sizing process after a sintering process; and the part (b) shows a state after the sizing process.
Figure 11:
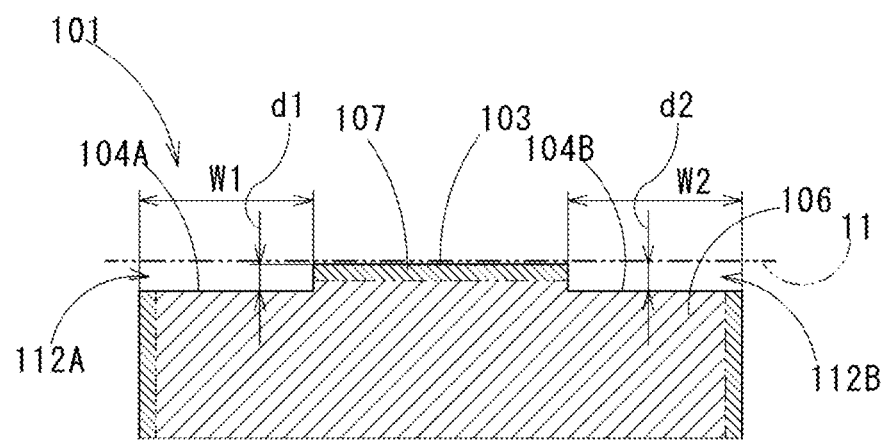
Figure 17:
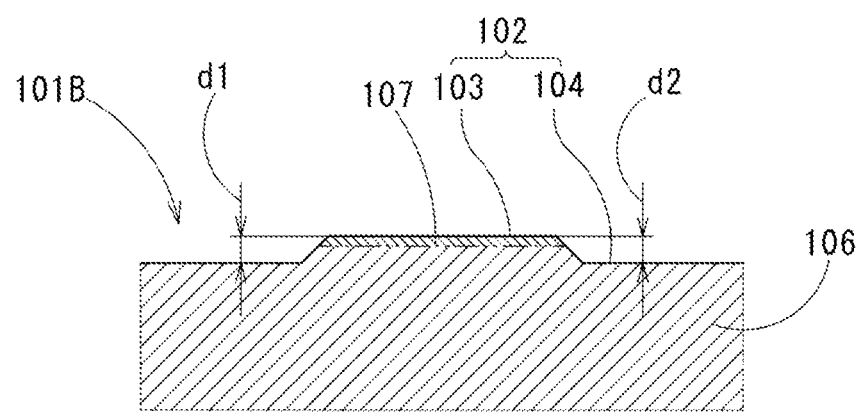
FIG. 17 is a schematic sectional view in a vicinity of an inner circumferential surface of a bearing hole showing a modified example of a connection part between a sliding surface and oil supply surfaces of the bearing hole in the oil-impregnated sintered bearing according to the second embodiment of the present invention.

In addition, also in the oil-impregnated sintered bearing 101 of the second embodiment, as shown in a part (b) in FIG. 11, side surfaces connecting between the sliding surface 103 and bottom surfaces of the oil supply surfaces 104A and 104B are formed to be orthogonal to the bottom surfaces of the oil supply surfaces 104A and 104B; however, as in an oil-impregnated sintered bearing 101B shown in FIG. 17, side surfaces connecting between the bottom surfaces of the oil supply surfaces 104A and 104B and the sliding surface 103 may be formed of tapered surfaces in which diameters are gradually reduced.

In the first embodiment, the oil supply surface is formed at a middle part of the bearing hole in the longitudinal direction; meanwhile, in the second embodiment, the oil supply surfaces are formed at both the end parts of the bearing hole; however, combining these structure, the oil supply surfaces can be formed at the middle part and the end parts in the longitudinal direction of the bearing hole. In this case, it is preferable that a height gap between a sliding surface and an oil supply surface formed at a middle part of the bearing hole in a longitudinal direction be set not less than 0.01% and not more than 0.5% of the inner diameter D1 of the sliding surface; and a height gap between sliding surfaces and oil supply surfaces formed at both end parts of the bearing hole be set not less than 0.5% and not more than 15% of the inner diameter D1 of the sliding surfaces.

EXAMPLES

Experimental results performed for demonstrating effects of the present invention will be explained.

For the experiments, iron-copper based powder in which iron, copper, tin, graphite and the like are mixed was used as material powder. The material powder made from iron-copper based powder was prepared from 50 mass % of copper powder, 2 mass % of tin powder, 5 mass % of copper-phosphorus powder, 10 mass % of copper-zinc power, 0.5 mass % of solid lubricant such as graphite, and iron powder as a residual part. The copper powder was mixture of flat powder with an aspect ratio not smaller than 10 and a maximum diameter not smaller than 1 µm and not larger than 100 µm and granular powder with an average granule diameter not smaller than 5 µm and not larger than 100 µm: a mixture percentage of the flat powder in the copper powder was 25 mass %. An average granule diameter of the iron powder was equal to or larger than the average granule diameter of the granular powder in the copper powder.

Experimental Example 1

Figure 18:
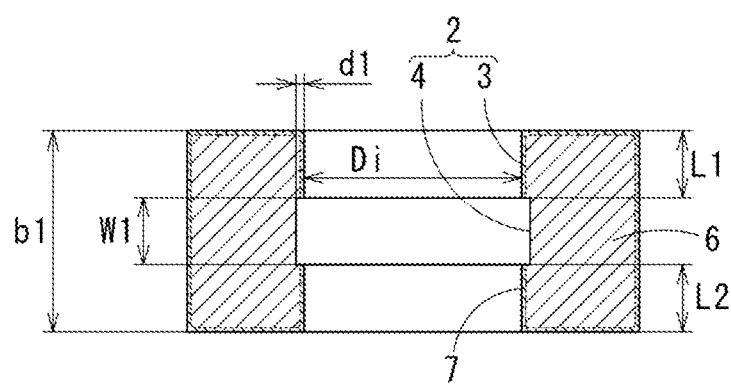
FIG. 18 is a sectional schematic view explaining a structure of an oil-impregnated sintered bearing of a practical example examined in an experimental example 1 regarding the first embodiment.
Figure 18:
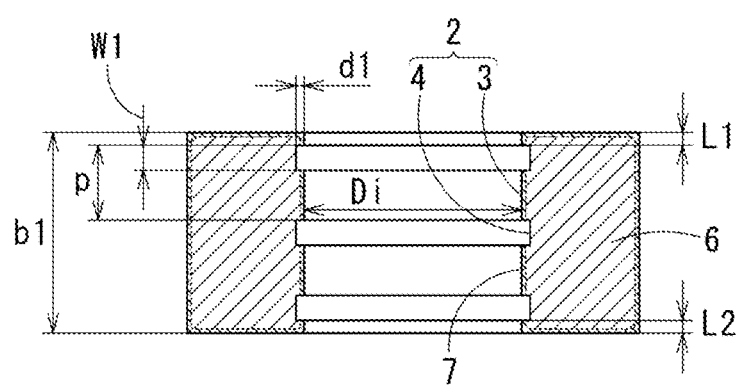
Figure 19:
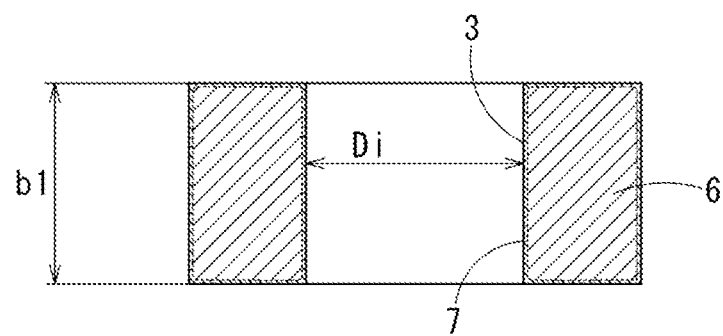
FIG. 19 is a sectional schematic view explaining a structure of an oil-impregnated sintered bearing of a comparative example examined in the experimental example 1 regarding the first embodiment.
Figure 19:
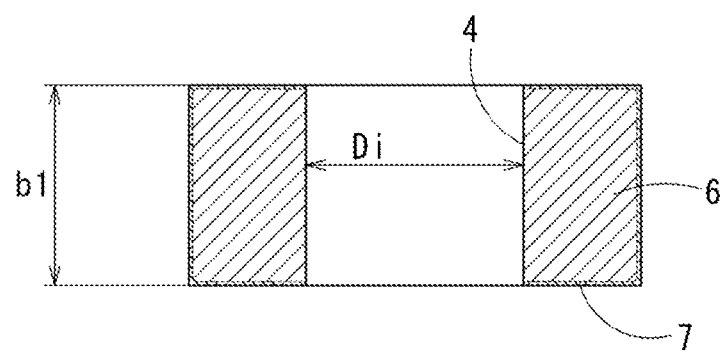

The material powder was compressed at 150 to 400 MPa and formed into a green compact in a green-compact forming process; and a sintered body having a protruded surface and an oil supply surface with a height gap "d0" at an inner circumferential surface thereof was formed by sintering at temperature 800 to 950° C. in a sintering process; then performing a sizing process, finally, as shown in FIG. 18 or FIG. 19, formed was an oil-impregnated sintered bearing (hereinafter, it will be omitted and called "bearing") having a sliding surface and an oil supply surfaces with a height gap "d1" at an inner circumferential surface of a bearing hole. The oil supply surface(s) were formed with a width W1, a height gap (a depth) "d1", and a pitch (a distance) "p" shown in Table 1: the sliding surface(s) were formed at the other parts than the oil supply surface(s) of the inner circumferential surface of the bearing hole. Each length "b1" of the bearings was 8 mm Each inner diameter D1 of the sliding surface was 8 mm.

Dimensions and reference symbols shown in Table 1, FIG. 18 and FIG. 19 correspond to the dimensions and the reference symbols of the bearing 1 shown in FIG. 1 and FIG. 2. In addition, a distance L1 shows a distance between an end surface to a first oil supply surface of the bearing: the oil supply surfaces after a second one are each formed at distances of the pitch "p".

A part (a) in FIG. 18 corresponds to bearings of Nos. 1 to 3 in Table 1: fields of the pitch "p" were shown as "-", since the bearings of Nos. 1 to 3 were formed with one oil supply surface without providing plural. A part (b) in FIG. 18 corresponds to bearings of Nos. 4 to 14 and Nos. 17 to 19: these bearings Nos. 4 to 14 and Nos. 17 to 19 were formed with two or more oil supply surfaces. In the bearings Nos. 4 to 8, Nos. 11 to 14, and Nos. 17 to 19, a first oil supply surface was formed with a distance L1 from an end surface, and a last oil supply surface was formed with a distance L2 from another end surface of the bearing. In the bearing No. 9, since a first oil supply surface was formed close to an end surface of the bearing, a distance L1 was zero. In the bearing No. 10, since a last oil supply surface was formed close to another end surface of the bearing, a distance L2 was zero.

A part (a) of FIG. 19 corresponds to a bearing No. 15: the bearing No. 15 was formed without an oil supply surface so that a whole surface of an inner circumferential surface of a bearing hole was a sliding surface. Accordingly, the fields of the dimensions (the distance L1, the width W1 and the like) of the oil supply surface were shown as "-". A part (b) in FIG. 19 corresponds to a bearing No. 16: the bearing No. 16 was formed without a sliding surface so that a whole surface of an inner circumferential surface of a bearing hole was an oil supplying surface. Accordingly, a field of a surface opening percentage of the sliding surface is shown as "-". In the bearing No. 16, an inner diameter of the oil supply surface was set 8 mm, equal to the inner diameter D1 of the sliding surface of the other bearings having the sliding surface.

The area rate "a" of the sliding surface in regard to the whole inner circumferential surface of the bearing hole and the height gap "d1" between the sliding surface and the oil supply surface in Table 1 were measured with a "contracer" (a contour measurement device manufactured by Mitutoyo Corporation) on the inner circumferential surface of the bearing hole. The surface opening percentages of the sliding surface and the oil supply surface were obtained by: taking respective SEM images (SEI) with a magnification of 500 of the sliding surface and the oil supply surface of the bearing; binarizing the photographs thereof by an image analysis software so as to extract opening parts; and measuring the area rate of the opening parts. For measuring the area rate of the opening parts, five test pieces (bearings) were prepared for the respective different conditions of the bearings; and the photographs for the area rate of the opening parts were taken at five fields respectively on the sliding surface and the oil supply surface of the respective bearings. The surface opening percentages were respective average values of measured results of the photographs of 25 fields. Similarly, circle-equivalent diameters were measured in 25 SEM images at the respective sliding surfaces, and average values thereof were obtained as average circle-equivalent diameters of the opening parts of the pores ("pore opening diameter" in Tables).

After impregnating oil into the obtained bearings, inserting a shaft into the bearing hole, rotating the shaft in a state in which loading surface pressure shown in Table 2 was added in an orthogonal direction to an axis, durability of the bearings were evaluated. As evaluation of the durability, rotating the shaft at a rotation number 12500 (rpm) for 30 minutes in the respective bearings, it was rejected if a bearing seizure was occurred between the shaft and the bearing, or passed if a bearing seizure was not occurred.

TABLE 1

| No. | SLIDING SURFACE AREA RATE "a" | HEIGHT GAP "d0" (%) | OIL SUPPLY SURFACE | | | | | | SURFACE OPENING (%) PERCENTAGE | | PORE OPENING DIAMETER (μm) |
| | | | DISTANCE L1 (mm) | DISTANCE L2 (mm) | WIDTH W1 (mm) | NUMBER | PITCH "p" (mm) | HEIGHT GAP "d1" (%) | SLIDING SURFACE | OIL SUPPLY SURFACE | |
|---|---|---|---|---|---|---|---|---|---|---|---|
| 1  | 0.875  | 0.63 | 3.5  | 3.5  | 1   | 1 | —   | 0.06 | 2  | 15 | 10 |
| 2  | 0.9625 | 0.5  | 3.75 | 3.75 | 0.3 | 1 | —   | 0.25 | 8  | 16 | 18 |
| 3  | 0.625  | 0.38 | 2.5  | 2.5  | 3   | 1 | —   | 0.13 | 8  | 15 | 13 |
| 4  | 0.875  | 0.38 | 0.5  | 0.5  | 0.5 | 2 | 6.5 | 0.25 | 5  | 18 | 19 |
| 5  | 0.625  | 0.5  | 0.5  | 0.5  | 1   | 3 | 3   | 0.01 | 3  | 17 | 9  |
| 6  | 0.5    | 0.25 | 1    | 1    | 2   | 2 | 4   | 0.06 | 5  | 15 | 12 |
| 7  | 0.75   | 0.63 | 0.5  | 0.5  | 1   | 2 | 6   | 0.13 | 3  | 18 | 11 |
| 8  | 0.6875 | 0.13 | 0.5  | 1    | 0.5 | 5 | 1.5 | 0.01 | 8  | 15 | 9  |
| 9  | 0.5    | 0.38 | 0    | 1    | 1   | 4 | 2   | 0.13 | 7  | 16 | 13 |
| 10 | 0.4    | 0.38 | 0.8  | 0    | 1.2 | 4 | 2   | 0.13 | 7  | 18 | 13 |
| 11 | 0.5    | 0.95 | 1    | 1    | 2   | 2 | 4   | 0.45 | 2  | 15 | 17 |
| 12 | 0.5    | 0.75 | 1    | 1    | 2   | 2 | 4   | 0.35 | 4  | 16 | 16 |
| 13 | 0.875  | 0.38 | 0.5  | 0.5  | 0.5 | 2 | 6.5 | 0.25 | 9  | 30 | 26 |
| 14 | 0.625  | 0.5  | 0.5  | 0.5  | 1   | 3 | 3   | 0.3  | 6  | 30 | 22 |
| 15 | 1      | —    | —    | —    | —   | 0 | —   | 0    | 6  | 6  | 9  |
| 16 | 0      | —    | 0    | 0    | 8   | 1 | —   | 0    | 18 | 18 | 25 |
| 17 | 0.375  | 0.5  | 0.5  | 0.5  | 1   | 5 | 1.5 | 0.13 | 4  | 16 | 12 |

TABLE 1-continued

| | | OIL SUPPLY SURFACE | | | | | | SURFACE OPENING | | |
|---|---|---|---|---|---|---|---|---|---|---|
| | SLIDING | HEIGHT | | | | | HEIGHT | (%) PERCENTAGE | | PORE |
| No. | SURFACE AREA RATE "a" | GAP "d0" (%) | DISTANCE L 1 (mm) | DISTANCE L 2 (mm) | WIDTH W 1 (mm) | NUMBER | PITCH "p" (mm) | GAP "d1" (%) | SLIDING SURFACE | OIL SUPPLY SURFACE | OPENING DIAMETER (μm) |
| 18 | 0.25 | 0.5 | 0.5 | 0.5 | 2 | 3 | 2.5 | 0.13 | 4 | 16 | 12 |
| 19 | 0.5 | 0.55 | 1 | 1 | 2 | 2 | 4 | 0.2 | 13 | 17 | 14 |

TABLE 2

| | DURABILITY | |
|---|---|---|
| No. | 2.5 (MPa) | 5.0 (MPa) |
| 1 | PASSED | PASSED |
| 2 | PASSED | PASSED |
| 3 | PASSED | PASSED |
| 4 | PASSED | PASSED |
| 5 | PASSED | PASSED |
| 6 | PASSED | PASSED |
| 7 | PASSED | PASSED |
| 8 | PASSED | PASSED |
| 9 | PASSED | PASSED |
| 10 | PASSED | PASSED |
| 11 | PASSED | PASSED |
| 12 | PASSED | PASSED |
| 13 | REJECTED | REJECTED |
| 14 | REJECTED | REJECTED |
| 15 | REJECTED | REJECTED |
| 16 | REJECTED | REJECTED |
| 17 | PASSED | REJECTED |
| 18 | PASSED | REJECTED |
| 19 | REJECTED | REJECTED |

Regarding the bearings (Nos. 1 to 12, 17 and 18), it is found from the results in Table 1 and Table 2 that the bearing seizure between the bearing and the shaft was not occurred at 2.5 MPa of the loading surface pressure, and the bearing property was excellent: in the bearings (Nos. 1 to 12, 17 and 18), the height gap "d1" between the sliding surface(s) and the oil supply surface(s) was not less than 0.01% and not more than 0.5% of the inner diameter D1 of the sliding surface(s), at the sliding surface the surface opening percentage of the sliding surface(s) was not more than 10% and the average circle-equivalent diameter of the opening parts of the pores was not larger than 20 μm, and the surface opening percentage of the oil supply surface was higher than 10%. In the bearings (Nos. 1 to 12), moreover, the area rate "a" of the sliding surface is not less than 0.4 and not more than 0.98, the bearing seizure was not occurred even at 5.0 MPa of the loading surface pressure, and the excellent bearing property was shown.

Experimental Example 2

Figure 20:
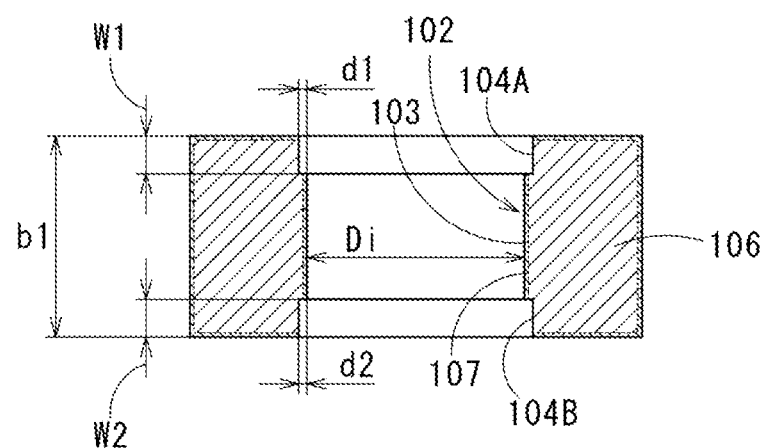
FIG. 20 is a sectional schematic view explaining a structure of an oil-impregnated sintered bearing of a practical example examined in an experimental example 2 regarding the second embodiment.
Figure 20:
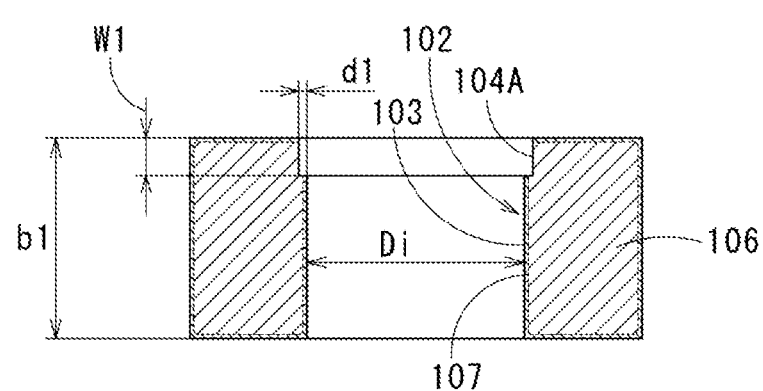
Figure 20:
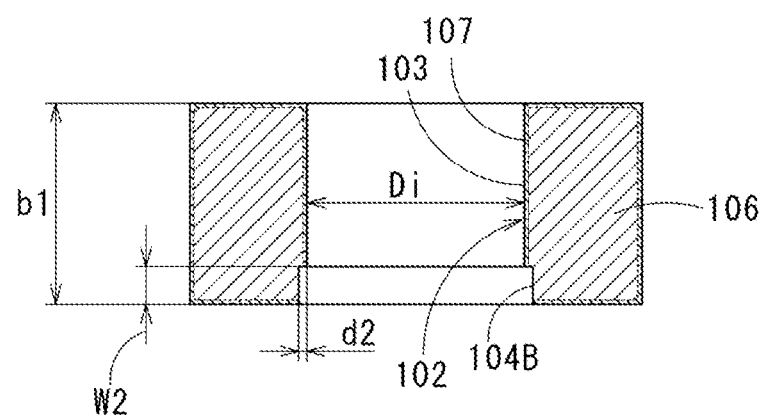
Figure 21:
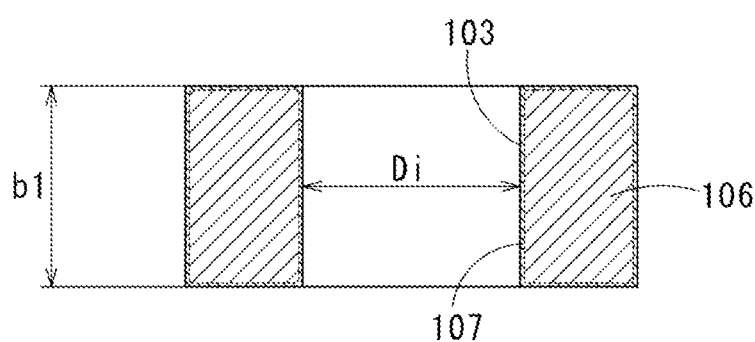
FIG. 21 is a sectional schematic view explaining a structure of an oil-impregnated sintered bearing of a comparative example examined in the experimental example 2 regarding the second embodiment.
Figure 21:
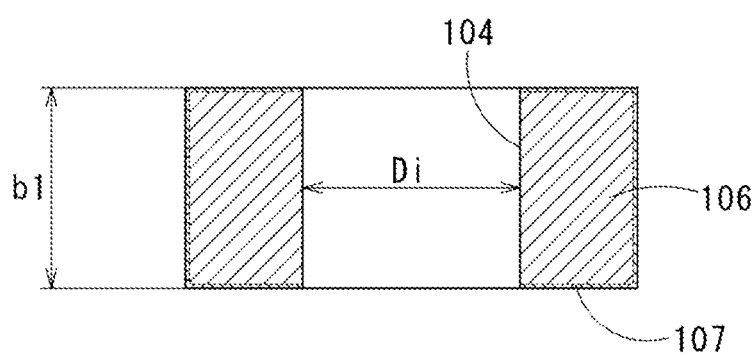

The material powder was compressed at 150 to 400 MPa and formed into a green compact in a green-compact forming process; and a sintered body having a protruded surface and oil supply surfaces with height gaps "d51" and "d52" at an inner circumferential surface thereof was formed by sintering at temperature 800 to 950° C. in a sintering process; then performing a sizing process, finally, as shown in FIG. 20 or FIG. 21, formed was an oil-impregnated sintered bearing (hereinafter, it will be omitted and called "bearing") having a sliding surface 103 and oil supply surfaces 104A and 104B with height gaps "d1" and "d2" at an inner circumferential surface of a bearing hole 102. The oil supply surfaces 104A and 104B were formed at widths W1 and W2 and the height gaps (depths) "d1" and "d2" shown in Table 3: the sliding surface 103 was formed at the other parts on the inner circumferential surface of the bearing hole 102 than the oil supply surfaces 104A and 104B. Each length "b1" of the bearings was 8 mm Each inner diameter D1 of the sliding surface 103 was 8 mm Dimensions and reference symbols shown in Table 3, FIG. 20 and FIG. 21 correspond to the dimensions and the reference symbols of the bearing 101 shown in FIG. 10 and FIG. 11.

A part (a) in FIG. 20 corresponds to bearings Nos. 21, 24 to 26, 28, 29 and 32 to 34 in Table 3: in the bearings Nos 21, 24 to 26, 28, 29 and 32 to 34, the oil supply surfaces 104A and 104B were formed on both ends of the bearing hole. A part (b) in FIG. 20 corresponds to bearings Nos. 22 and 27: in the bearings Nos. 22 and 27, the oil supply surface 104A was formed only on an upper side of the bearing hole. A part (c) in FIG. 20 corresponds to a bearing No. 23: in the bearing No. 23, the oil supply surface 104B was formed only on a lower side of the bearing hole.

A part (a) in FIG. 21 corresponds to a bearing No. 30: in the bearing No. 30, no oil supply surface was provided, and the whole inner circumferential surface of the bearing hole was formed from the sliding surface 103. Accordingly, fields of the dimensions (the width W1 and the like) of the oil supply surface were shown as "-". A part (b) in FIG. 21 corresponds to a bearing No. 31: in the bearing No. 31, no sliding surface was provided, and the whole inner circumferential surface of the bearing hole was formed from the oil supply surface 104. Accordingly, fields of the surface opening percentage of the sliding surface were shown as "-". Regarding the bearing No. 31, an inner diameter of the oil supply surface 104 was set 8 mm, equal to the inner diameter D1 of the sliding surface of the other bearings having the sliding surface.

The area rate "a" of the sliding surface in regard to the whole inner circumferential surface of the bearing hole in Table 3 and the height gaps "d1" and "d2" between the sliding surface and the oil supply surface(s) were measured with the Contracer on the inner circumferential surface of the bearing hole. The surface opening percentages of the sliding surface and the oil supply surface(s) were obtained by: taking respective SEM images (SEI) with a magnification of 500 of the sliding surface and the oil supply surface(s) of the bearing; binarizing the photographs thereof by the image analysis software so as to extract opening parts; and measuring the area rate of the opening parts. For measuring the area rate of the opening parts, five test pieces (bearings) were prepared for the respective different conditions of the bearings, and the photographs for the area rate of the opening parts were taken at five fields respectively on the sliding surface and the oil supply surface(s) of the respective bearings. The surface opening percentages were respective average values of measured results of the photographs of 25 fields. Similarly, circle-equivalent diameters were measured in 25 SEM images at the respective sliding surfaces, and average values thereof were obtained as average circle-equivalent diameters of the opening parts of the pores ("pore opening diameter" in Tables).

After impregnating oil into the obtained bearings, inserting a shaft into the bearing hole, rotating the shaft in a state in which loading surface pressure shown in Table 4 was added in an orthogonal direction to an axis, durability of the bearings were evaluated. As evaluation of the durability, rotating the shaft at a rotation number 12500 (rpm) for 30 minutes in the respective bearings, it was rejected if a bearing seizure was occurred between the shaft and the bearing, or passed if a bearing seizure was not occurred.

face was not more than 10%, the average circle-equivalent diameter of the opening parts of the pores was not larger than 20 μm at the sliding surface, and the surface opening percentage of the oil supply surface was higher than 10%. In the bearings (Nos. 21 to 27), moreover, the area rate "a" of the sliding surface is not less than 0.4 and not more than 0.98, a bearing seizure was not occurred even at 5.0 MPa of the loading surface pressure, and the excellent bearing property was shown.

INDUSTRIAL APPLICABILITY

This oil-impregnated sintered bearing can be utilized broadly as a bearing such as a bearing for a motor in a vehicle.

TABLE 3

| | | OIL SUPPLY SURFACE | | | | | |
| | | UPPER SIDE | | LOWER SIDE | | SURFACE OPENING PERCENTAGE (%) | |
| | SLIDING | HEIGHT | | HEIGHT | | | PORE |
| No. | SURFACE AREA RATE "a" | WIDTH W 1 (mm) | GAP "d1" (%) | WIDTH W 2 (mm) | GAP "d2" (%) | SLIDING SURFACE | OIL SUPPLY SURFACE | OPENING DIAMETER (μm) |
|---|---|---|---|---|---|---|---|---|
| 21 | 0.875 | 0.5 | 3.75 | 0.5 | 2.5 | 3 | 17 | 7 |
| 22 | 0.875 | 1 | 2.5 | — | — | 5 | 15 | 11 |
| 23 | 0.75 | — | — | 2 | 6.25 | 5 | 16 | 13 |
| 24 | 0.75 | 1 | 3.75 | 1 | 2.5 | 8 | 18 | 17 |
| 25 | 0.5 | 2 | 3.75 | 2 | 3.75 | 5 | 15 | 10 |
| 26 | 0.4 | 2.4 | 1.25 | 2.4 | 3.75 | 3 | 16 | 7 |
| 27 | 0.9625 | 0.3 | 1.5 | — | — | 5 | 18 | 12 |
| 28 | 0.75 | 1 | 3.75 | 1 | 2.5 | 9 | 25 | 22 |
| 29 | 0.5 | 2 | 3.75 | 2 | 3.75 | 9 | 30 | 25 |
| 30 | 1 | — | — | — | — | 6 | 6 | 12 |
| 31 | 0 | — | 0.375 | — | 0.375 | 18 | 18 | 25 |
| 32 | 0.25 | 3 | 1.25 | 3 | 5 | 5 | 15 | 10 |
| 33 | 0.75 | 1 | 12.5 | 1 | 16 | 5 | 15 | 11 |
| 34 | 0.75 | 1 | 5 | 1 | 5 | 12 | 18 | 18 |

TABLE 4

| | DURABILITY | |
| No. | 2.5 (MPa) | 5.0 (MPa) |
|---|---|---|
| 21 | PASSED | PASSED |
| 22 | PASSED | PASSED |
| 23 | PASSED | PASSED |
| 24 | PASSED | PASSED |
| 25 | PASSED | PASSED |
| 26 | PASSED | PASSED |
| 27 | PASSED | PASSED |
| 28 | REJECTED | REJECTED |
| 29 | REJECTED | REJECTED |
| 30 | REJECTED | REJECTED |
| 31 | REJECTED | REJECTED |
| 32 | PASSED | REJECTED |
| 33 | REJECTED | REJECTED |
| 34 | REJECTED | REJECTED |

Regarding the bearings (Nos. 21 to 27, and 32), it is found from the results in Table 3 and Table 4 that the bearing seizure between the bearing and the shaft was not occurred at 2.5 MPa of the loading surface pressure, and the bearing property was excellent: in the bearings (Nos. 21 to 27, and 32), the height gaps "d1" and "d2" between the sliding surface and the oil supply surface(s) were not less than 0.5% and not more than 15% of the inner diameter of the sliding surface, the surface opening percentage of the sliding sur-

REFERENCE SIGNS LIST 1, 1B, 101, 101B oil-impregnated sintered bearing
2, 102 bearing hole
3, 103 sliding surface
4, 104A, 104B oil supply surface
5A, 105A green compact
5B, 105B sintered body
6, 106 porous layer
7, 107 dense layer
11 shaft
112A, 112B space part
20, 120 forming die
21, 121 forming die plate
21a, 121a forming through hole
22, 122 forming core rod
22b large-diameter surface
23, 123 forming lower punch
123c small-diameter surface
24, 124 forming upper punch
124c small-diameter surface
25, 125 forming tubular space
30, 130 sizing die
31, 131 sizing die plate
31a, 131a sizing through hole
32, 132 sizing core rod
33, 133 sizing lower punch 34, 134 sizing upper punch
35, 135 sizing tubular space

The invention claimed is:

1. An oil-impregnated sintered bearing comprising:
a bearing hole into which a shaft can be inserted;
end surfaces; and
outer circumferential surfaces, wherein
on an inner circumferential surface of the bearing hole, one or more sliding surfaces supporting an outer circumferential surface of the shaft and one or more oil supply surfaces having a larger radius of curvature than that of the one or more sliding surfaces are formed, the one or more sliding surfaces and the one or more oil supply surfaces being adjacent to each other along an axial direction of the bearing hole,
a height gap between the one or more sliding surfaces and the one or more oil supply surfaces is not less than 0.01% and not more than 15% of an inner diameter of the one or more sliding surfaces,
a surface opening percentage of the one or more sliding surfaces is not more than 10%,
a surface opening percentage of the one or more oil supply surfaces is more than 10%
an average circle-equivalent diameter of opening parts of pores at the one or more sliding surfaces is not larger than 20 μm, and
dense layers in which the pores are sealed are formed on the sliding surfaces, the end surfaces and the outer circumferential surfaces of the oil-impregnated sintered bearing.

2. The oil-impregnated sintered bearing according to claim 1, wherein when an area ratio of the one or more sliding surfaces is "a" in regard to a whole area of the bearing hole as 1, the ratio "a" is not less than 0.4 and not more than 0.98.

3. The oil-impregnated sintered bearing according to claim 2, wherein the one or more oil supply surfaces are provided at a part except for both end parts of the bearing hole; and the height gap between the one or more sliding surfaces and the one or more oil supply surfaces is not less than 0.01% and not more than 0.5% of the inner diameter of the one or more sliding surfaces.

4. The oil-impregnated sintered bearing according to claim 3, wherein the one or more oil supply surfaces are formed between the sliding surfaces.

5. The oil-impregnated sintered bearing according to claim 2, wherein the one or more oil supply surfaces are provided opening at least one of end parts of the bearing hole, and the height gap between the one or more sliding surfaces and the one or more oil supply surfaces is not less than 0.5% and not more than 15% of the inner diameter of the one or more sliding surfaces.

6. The oil-impregnated sintered bearing according to claim 5, wherein the one or more oil supply surfaces is formed at both the end parts of the inner circumferential surface of the bearing hole.

7. The oil-impregnated sintered bearing according to claim 1, wherein the one or more oil supply surfaces are provided at a part except for both end parts of the bearing hole; and the height gap between the one or more sliding surfaces and the one or more oil supply surfaces is not less than 0.01% and not more than 0.5% of the inner diameter of the one or more sliding surfaces.

8. The oil-impregnated sintered bearing according to claim 7, wherein the one or more oil supply surfaces are formed between the sliding surfaces.

9. The oil-impregnated sintered bearing according to claim 1, wherein the one or more oil supply surfaces are provided opening at least one of end parts of the bearing hole, and the height gap between the one or more sliding surfaces and the one or more oil supply surfaces is not less than 0.5% and not more than 15% of the inner diameter of the one or more sliding surfaces.

10. The oil-impregnated sintered bearing according to claim 9, wherein the one or more oil supply surfaces is formed at both the end parts of the inner circumferential surface of the bearing hole.

11. A method for manufacturing an oil-impregnated sintered bearing comprising:
a green-compact forming process forming a tubular green compact by filling and compressing material powder in a forming tubular space between a forming die plate having a forming through hole and a forming inner die arranged in a center of the forming through hole;
a sintering process forming a sintered body by sintering the green compact; and
a sizing process sizing a dimension of the sintered body and forming a bearing hole in the sintered body into which a shaft can be inserted, by pushing and compressing the sintered body in a sizing tubular space between a sizing die plate and a sizing core rod of a sizing die, wherein
in the green-compact forming process, an inner circumferential surface of the green compact is formed by using the forming inner die, which has one or more radially-protruded surfaces on an outer circumferential surface thereof, said one or more radially-protruded surfaces outwardly protruded in a radial direction, so that the one or more depressed surfaces and one or more protruded surfaces adjacent to the one or more depressed surfaces are formed on the inner circumferential surface of the green compact, and a height gap between the one or more depressed surfaces and the one or more protruded surfaces is formed to be not smaller than 0.1% and not larger than 15.5% of an inner diameter of the one or more protruded surfaces;
in the sintering process, the green compact is sintered, so that the sintered body in which has a surface opening percentage higher than 10% at an inner circumferential surface, and the one or more depressed surfaces are formed as one or more oil supply surfaces;
in the sizing process, an outer circumferential surface of the sizing core rod that is formed with an outer diameter larger than the one or more protruded surfaces of the sintered body and smaller than the one or more depressed surfaces, forms one or more sliding surfaces in which a surface opening percentage is not higher than 10% and an average circle-equivalent diameter of opening parts of pores is not larger than 20 μm, by compressing outwardly the one or more protruded surfaces that are formed on the inner circumferential surface of the sintered body in a radial direction, so that a height gap between the one or more oil supply surfaces and the one or more sliding surfaces is not less than 0.01% and not more than 15% of an inner diameter of the one or more sliding surfaces, and the one or more oil supply surfaces and the one or more sliding surfaces are provided on an inner circumferential surface of the bearing hole; and
further in the sizing process, the sintered body is compressed in an axial direction of the bearing hole between a sizing upper punch and a sizing lower punch.

12. The method for manufacturing an oil-impregnated sintered bearing according to claim 11, wherein
- the forming inner die is a forming core rod that is inserted into the forming through hole;
- the height gap between the one or more depressed surfaces and the one or more protruded surfaces are formed to be not less than 0.1% and not more than 1.0% of the inner diameter of the one or more protruded surfaces; and
- the height gap between the one or more oil supply surfaces and the one or more sliding surfaces is formed to be not less than 0.01% and not more than 0.5% of the inner diameter of the one or more sliding surface.

13. The method for manufacturing an oil-impregnated sintered bearing according to claim 11, wherein:
- the forming inner die is composed of a forming core rod inserted into a center of the forming through hole and either one of an upper end part of a forming lower punch or a lower end part of a forming upper punch that is inserted into the forming tubular space;
- the one of the punches has a reduced-diameter surface formed on an outer circumferential surface of the end part in which an outer diameter is smaller than the other part of the one of the punches;
- in the green-compact forming process, forming a depressed surface in which a radius of curvature is larger than the other part, by the reduced-diameter surface, at an end part in an axial direction on the inner circumferential surface at of the green compact, so that the depressed surface that opens at the end part in the axial direction and a protruded surface that is adjacent to the depressed surface are formed on the inner circumferential surface of the green compact; and a height gap between the depressed surface and the protruded surface is formed not to be less than 1.0% and not to be more than 15.5% of an inner diameter of the protruded surface; and
- in the sizing process, the one or more oil supply surfaces and the one or more sliding surfaces are formed with the height gap therebetween to be not less than 0.5% and not more than 15% of the inner diameter of the one or more sliding surfaces.

\* \* \* \* \*